(12) United States Patent
Durkot et al.

(10) Patent No.: US 7,273,680 B2
(45) Date of Patent: Sep. 25, 2007

(54) ALKALINE BATTERY INCLUDING NICKEL OXYHYDROXIDE CATHODE AND ZINC ANODE

(75) Inventors: Richard E. Durkot, East Walpole, MA (US); Dean MacNeil, Cambridge, MA (US); Paul A. Christian, Norton, MA (US); Francis Wang, Framingham, MA (US); George Cintra, Holliston, MA (US); James R. Costanzo, Danbury, CT (US)

(73) Assignee: The Gillette Company, Boston, MA (US)

( * ) Notice: Subject to any disclaimer, the term of this patent is extended or adjusted under 35 U.S.C. 154(b) by 724 days.

(21) Appl. No.: 10/831,899

(22) Filed: Apr. 26, 2004

(65) Prior Publication Data

US 2004/0197656 A1 Oct. 7, 2004

Related U.S. Application Data

(63) Continuation-in-part of application No. 10/228,957, filed on Aug. 28, 2002, now Pat. No. 6,991,875.

(51) Int. Cl.
*H01M 4/32* (2006.01)
*H01M 4/52* (2006.01)
*H01M 4/42* (2006.01)

(52) U.S. Cl. .............. 429/223; 429/206; 429/229; 429/231.8; 429/232

(58) Field of Classification Search .............. None
See application file for complete search history.

(56) References Cited

U.S. PATENT DOCUMENTS

| | | | |
|---|---|---|---|
| 5,451,475 A | 9/1995 | Ohta | |
| 5,500,309 A | 3/1996 | Lichtenberg | |
| 5,626,988 A * | 5/1997 | Daniel-Ivad et al. | 429/229 |
| 6,210,833 B1 | 4/2001 | Bernard | |
| 6,284,410 B1 | 9/2001 | Durkot | |
| 6,472,103 B1 | 10/2002 | Durkot | |
| 6,492,062 B1 | 12/2002 | Wang | |
| 6,521,378 B2 | 2/2003 | Durkot | |
| 6,558,842 B2 | 5/2003 | Seyama | |
| 6,576,368 B1 | 6/2003 | Ogasawara | |
| 6,617,072 B2 | 9/2003 | Venkatesan | |
| 6,686,091 B2 | 2/2004 | Yamamoto et al. | |
| 2003/0068549 A1 * | 4/2003 | Daniel-Ivad et al. | 429/212 |
| 2003/0186125 A1 | 10/2003 | Shimakawa | |
| 2003/0232247 A1 | 12/2003 | Loffler | |
| 2004/0009394 A1 | 1/2004 | Ito | |

FOREIGN PATENT DOCUMENTS

| | | |
|---|---|---|
| EP | 1341248 A1 | 9/2003 |
| EP | 1372201 A1 | 12/2003 |
| JP | 57-182972 | 11/1982 |
| JP | 2003-017077 | 1/2003 |
| JP | 2003-086163 | 3/2003 |

(Continued)

*Primary Examiner*—Patrick Joseph Ryan
*Assistant Examiner*—Angela J. Martin
(74) *Attorney, Agent, or Firm*—Barry D. Josephs

(57) ABSTRACT

A primary alkaline battery includes a cathode including a nickel oxyhydroxide and an anode including zinc or zinc alloy particles. Performance of the nickel oxyhydroxide alkaline cell is improved by adding zinc fines to the anode.

43 Claims, 1 Drawing Sheet

FOREIGN PATENT DOCUMENTS

| | | |
|---|---|---|
| JP | 2003-257423 A2 | 9/2003 |
| WO | WO 01/86740 A2 | 11/2001 |
| WO | WO 03034520 A1 | 4/2003 |
| WO | WO 03067689 A1 | 8/2003 |
| WO | WO 03/090956 A1 | 11/2003 |
| WO | WO 2004/010513 A2 | 1/2004 |
| WO | WO 2004025759 A1 | 3/2004 |

* cited by examiner

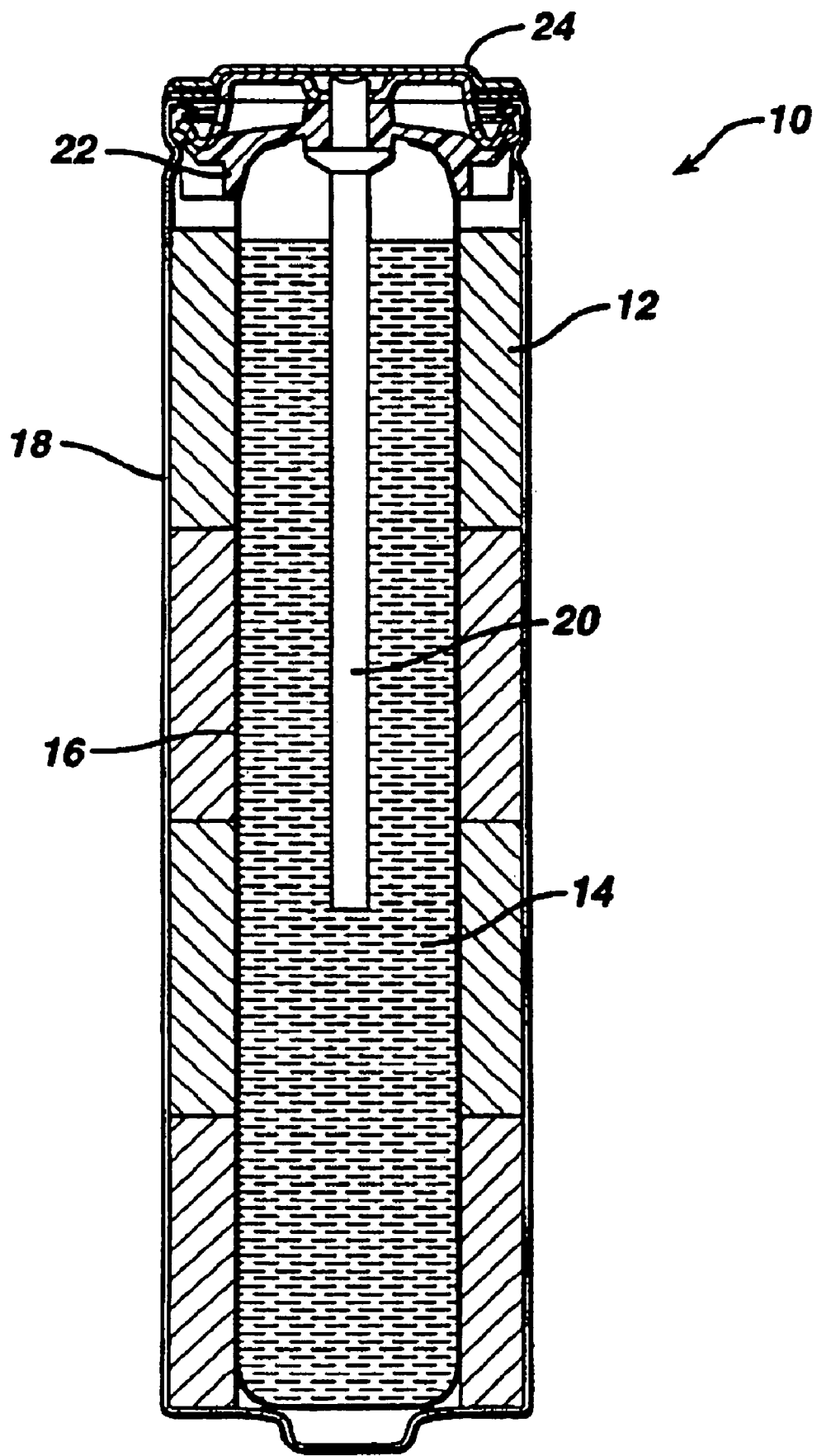

ALKALINE BATTERY INCLUDING NICKEL OXYHYDROXIDE CATHODE AND ZINC ANODE

CROSS REFERENCE TO RELATED APPLICATIONS

This application is a continuation in part of application Ser. No. 10/228,957 filed Aug. 28, 2002 now U.S. Pat. No. 6,991,875.

FIELD OF THE INVENTION

This invention relates to an alkaline battery including a nickel oxyhydroxide cathode and a zinc-based anode and a method of manufacturing an alkaline battery.

BACKGROUND

Conventional alkaline electrochemical cells are primary (non-rechargeable) cells having an anode comprising zinc, a cathode comprising manganese dioxide, and an alkaline electrolyte. The cell is formed of a cylindrical housing. The housing is initially formed with an open end. After the cell contents are introduced, an end cap that forms the negative terminal with insulating plug such as plastic grommet is inserted into the open end. The cell is closed by crimping the housing edge over an edge of the insulating plug and radially compressing the casing around the insulating plug to provide a tight seal. The housing serves as the cathode current collector and a portion of the housing forms the positive terminal.

In general, a primary alkaline cell includes an anode, a cathode, an electrolyte permeable separator between the anode and the cathode, typically containing a cellophane film, and an alkaline electrolyte contacting both the anode and the cathode. The anode includes an anode active material comprising zinc or zinc alloy particles and conventional gelling agents, such as carboxymethylcellulose or acrylic acid copolymers, and electrolyte. The gelling agent serves to immobilize the zinc particles in a suspension such that the zinc particles are in contact with one another. An anode current collector, typically a conductive metal nail is inserted into the gelled zinc anode. The alkaline electrolyte is typically an aqueous solution of potassium hydroxide, but can include aqueous solutions of sodium or lithium hydroxide. The cathode includes a cathode active material comprising manganese dioxide or nickel oxyhydroxide or mixtures thereof and an electrically-conductive additive, such as graphite, to increase electrical conductivity of the cathode.

A common problem associated with the design of primary alkaline cells, zinc/manganese dioxide cells in particular, is the tendency for a cell to generate hydrogen gas when it is discharged below a certain voltage, typically at or near the endpoint of the useful capacity of the cell. Zinc/manganese dioxide cells typically are provided with a rupturable diaphragm or membrane located within the end cap assembly of the cell. Such a rupturable diaphragm or membrane can be formed within a plastic insulating member as described, for example, in U.S. Pat. No. 3,617,386. When internal gas pressure increases to a predetermined value, the membrane can rupture thereby venting the gas to the external environment through apertures in the end cap thereby lowering the internal pressure.

Commercial cylindrical alkaline cells are available typically in AA, AAA, AAAA, C, and D sizes. Since commercial cell sizes and the corresponding internal volumes of these cells are fixed, in order to increase cell capacity, i.e., the useful service life of the cell, it has been necessary to increase the interfacial surface area of the electrode active material as well as to include greater amounts of active material in the cell. This approach has several practical limitations. If the active material is packed too densely into the cell this can produce a decrease in the rate of electrochemical reaction during discharge, thereby reducing service life of the cell. Other deleterious effects such as polarization can occur, particularly at high current drains (i.e., in high power applications). Polarization limits mobility of ions within the electrode active material as well as within the electrolyte, thereby reducing service life of the cell. Contact resistance between the cathode active material and the cell housing also can reduce service life.

Another problem associated with a zinc/manganese dioxide primary alkaline cell is that the cell characteristically has a sloping voltage profile, that is, the average running voltage gradually decreases as the cell is discharged. The rate of decrease in voltage is more pronounced as the cell is discharged at higher power drain rates, for example, either constantly or intermittently between about 0.25 and 1 Watt (i.e., between about 0.3 and 1 Amp), particularly between about 0.5 and 1 Watt. Thus, for a zinc/manganese dioxide cell, the actual cell capacity (milli-Amp-hrs) obtained at high power drain rates can be substantially less than at low power drains.

Thus, there is a need for a primary alkaline cell better suited to high power applications. Such a cell could be used as the main power source for a high power device or as a back-up power source to supplement a rechargeable battery to power such devices. Modern electronic devices such as cellular phones, digital cameras, digital audio players, CD/DVD players, handheld televisions, electronic flash units, remote controlled toys, personal digital assistants (i.e., PDAs), camcorders and high-intensity lamps are examples of high power applications. Thus, it is desirable to provide an improved primary alkaline cell having longer service life than a conventional zinc/manganese dioxide alkaline cell of the same size, particularly for use in those applications demanding high power.

Accordingly, it is desirable to provide such an improved alkaline cell in order to extend the useful service life of primary alkaline cells intended for use in high power devices.

It is also desirable to provide an improved alkaline cell having a reduced amount of hydrogen gassing, thereby improving storage characteristics and simplifying requirements for a suitable venting system.

SUMMARY OF THE INVENTION

A principal aspect of the invention is directed toward a primary (i.e., non-rechargeable) alkaline cell which includes a cathode including nickel oxyhydroxide(i.e., NiOOH), an anode, preferably including zinc, a separator positioned between anode and cathode, and an alkaline electrolyte contacting both anode and cathode.

In an another aspect of the invention, the cathode includes an active cathode material comprising nickel oxyhydroxide, conductive carbon particles including graphite, preferably an oxidation-resistant graphite, and an aqueous alkaline electrolyte solution. Generally, the cathode can include, for example, between 60% by weight and 97% by weight, between 80% by weight and 95% by weight, or between 85% by weight and 90% by weight of nickel oxyhydroxide. Optionally, the cathode also can include an oxidizing additive, a polymeric binder, or combinations thereof. An oxidizing additive is more readily reduced than the active cathode material and can thereby serve as a sacrificial additive. The presence of such an oxidizing additive can serve to stabilize the nickel oxyhydroxide thereby improving storage characteristics of the cell.

The nickel oxyhydroxide of the invention can include a beta-nickel oxyhydroxide, a cobalt oxyhydroxide-coated beta-nickel oxyhydroxide, a gamma-nickel oxyhydroxide, a cobalt oxyhydroxide-coated gamma-nickel oxyhydroxide, a solid solution of a beta-nickel oxyhydroxide and a gamma-nickel oxyhydroxide, a cobalt oxyhydroxide-coated solid solution of a beta-nickel oxyhydroxide and a gamma-nickel oxyhydroxide or a physical mixture of a beta-nickel oxyhydroxide and a gamma-nickel oxyhydroxide. Gamma-nickel oxyhydroxide is a non-stoichiometric phase of nickel oxyhydroxide containing both trivalent nickel and tetravalent nickel and can include a variable amount of water molecules, alkali metal cations, and anionic species inserted into the interlamellar region (viz., van der Waals gap) of the layered crystal structure. The nickel oxyhydroxide can be a powder including particles that have a nominally spherical, spheroidal, or ellipsoidal shape. The average particle size of nickel oxyhydroxide powder can range between 2 and 50 microns or 5 and 30 microns or 10 and 25 microns or 15 and 20 microns. The nickel oxyhydroxide can include at least one bulk dopant. The bulk dopant can include aluminum, manganese, cobalt, zinc, gallium, indium, or combinations thereof. The bulk dopant can be present at a relative weight percentage of less than about 10%, less than about 5% or less than about 2%. A bulk dopant can serve to reduce the open circuit voltage (OCV) of the cell slightly thereby decreasing oxidation of electrolyte during storage. Thus, the presence of a bulk dopant in nickel oxyhydroxide can improve storage characteristics of the cell.

Nickel oxyhydroxide particles can be coated with cobalt oxyhydroxide to cover at least 60% of their surface, at least 70%, at least 80%, at least 90% of their surface. Cobalt oxyhydroxide-coated nickel oxyhydroxide can be prepared from nickel hydroxide coated with between 2% and 15%, between 3% and 10% or between 4% and 6% cobalt hydroxide by weight. The cobalt oxyhydroxide coating can enhance inter-particle electrical contact between nickel oxyhydroxide particles in the cathode thereby improving bulk electrical conductivity of the cathode. The cobalt oxyhydroxide coating also can contribute to maintaining cell performance when a cell is stored for extended periods at high temperatures, for example, at 60° C. (140° F.). The cobalt oxyhydroxide coating can optionally include a dopant including, for example, sodium, magnesium, calcium, strontium, barium, scandium, yttrium, lanthanum, rare earth elements, titanium, zirconium, hafnium, chromium, manganese, nickel, copper, silver, zinc, cadmium, aluminum, gallium, indium, bismuth or combinations thereof.

The anode comprises zinc particles including any of the zinc-based particles conventionally used in slurry anodes for alkaline cells. The term zinc or zinc powder as used herein shall be understood to include zinc alloy powder which comprises a very high concentration of zinc and as such functions electrochemically essentially as pure zinc.

The anode can include, for example, between 60 wt. % and 80 wt. %, between 62 wt. % and 75 wt. %, preferably between about 62 wt. % and 72 wt. % of zinc particles admixed with gelling agent and aqueous alkaline electrolyte. The electrolyte can be an aqueous solution of alkali hydroxide, such as potassium hydroxide, sodium hydroxide, lithium hydroxide, or mixtures thereof. The electrolyte can contain between 15 wt. % and 60 wt. %, between 20 wt. % and 55 wt. %, or between 30 wt. % and 50 wt. % alkali hydroxide dissolved in water. The electrolyte can contain 0 wt. % to 6 wt. % of a metal oxide, such as zinc oxide. The zinc-based powder can have a mean average particle size, for example, between about 1 and 350 microns, desirably between about 1 and 250 microns, preferably between about 20 and 250 microns. Particle size and mean average particle size as reported herein, unless otherwise specified shall be construed as determined by the more common method employed in the art for determining particle size, namely, by laser diffraction based on a particle size distribution versus volume percent. The zinc or zinc alloy particles can be generally acicular in shape, having a length along a major axis at least two times a length along a minor axis, or the particles can be generally flake-like, each flake generally having a thickness of no more than about 20 percent of the maximum linear dimension of the particle.

In an aspect of the invention, the anode comprises zinc fines which are preferably mixed with zinc particles of larger average particle size. Thus in one aspect, the anode desirably includes at least 10 wt. %, at least 15 wt. %, at least 30 wt. %, or at least 80 wt. %, typically between 35 and 75 wt. % of the total zinc or zinc alloy particles small enough to pass through a 200 mesh size screen. Such −200 mesh zinc fines typically can have a mean average particle size between about 1 and 75 microns. Even very small amounts of zinc or zinc alloy particles, for example, at least about 5 wt. % or even at least about 1 wt. % of the total zinc or zinc alloy particles which are small enough to pass through a 200 mesh size screen, can have a beneficial effect on the anode performance of cells with cathodes comprising nickel oxyhydroxide. As used herein "zinc fines" are zinc-based particles small enough to pass through a 200 mesh size sieve. (viz., a sieve having square openings of 0.075 mm.) A table for converting between mesh size and square sieve opening size is included in the Detailed Description section. At least 25 wt. %, for example, at least 50 wt. % of the zinc or zinc alloy particles can have a larger particle size (e.g., −20/+200 mesh), that is, so that they will pass through a 20 mesh size sieve and are retained by a 200 mesh size sieve (i.e., a sieve having square openings of between about 0.850 mm and 0.075 mm). For example, when the total zinc in the anode comprises 10 wt. % zinc fines (batch 1) of 200 mesh size mixed with 90 wt. % larger size zinc particles (batch 2) between 20 and 200 mesh size, the mean average particle size of the total zinc particles may, for example, be about 340 microns. When the total zinc in the anode comprises 50 wt. % zinc fines (batch 1) of −200 mesh size mixed with 50 wt. % larger size zinc particles (batch 2) of between 20 and 200 mesh size, the mean average particle size of the total zinc particles, for example, can be about 200 microns. When the total zinc in the anode comprises 100 wt. % zinc fines of −200 mesh size, the mean average particle size of the total zinc particles typically can be between about 1 and 75 micron, for example, about 75 microns.

In another aspect, at least about 10 wt. %, at least 45 wt. %, or at least 80 wt. % of the zinc or zinc alloy particles can pass through a sieve of 325 mesh size (i.e., a sieve having square openings of 0.045 mm). The mean average particle size of a fraction of zinc-based particles capable of passing through a 325 mesh size sieve can typically be between about 1 and 35 microns, for example, about 35 microns. However, it should be understood that a portion of such a fraction can be comprised of very small zinc-based particles in the range from 1 to 35 microns, for example or between about 5 and 35 microns or between about 5 and 25 microns.

Even very small amounts, for example, at least about 5 wt. % or even at least about 1 wt. % of the total zinc or zinc alloy particles which are small enough to pass through a 325 mesh sieve, can have some beneficial effect on anode performance of cells with cathodes comprising nickel oxyhydroxide. At least 25 wt. %, for example, at least 50 wt. % of the zinc or zinc alloy particles can be larger, such that they can pass through a sieve having a mesh size between about 20 and 200. (i.e., a square opening of between about 0.850 mm and 0.075 mm). For example, when the total zinc in the anode includes 10 wt. % zinc fines (batch 1) of 325 mesh size mixed with 90 wt. % of larger zinc-based particles (batch 2) having a mesh size of between 20 and 200, the mean average particle size of the total zinc-based particles can for example, be about 314 microns. When the total zinc in the anode includes 50 wt. % zinc fines (batch 1) of −325 mesh size mixed with 50 wt. % larger size zinc-based particles (batch 2) of between 20 and 200 mesh size, the mean average particle size of the total zinc-based particles can, for example, be about 125 microns. When the total zinc in the anode comprises 70 wt. % zinc fines (batch 1) of −325 mesh size mixed with 30 wt. % of larger size zinc-based particles (batch 2) of between 20 and 200 mesh size, the mean average particle size of the total zinc-based particles may, for example, be about 50 microns. When the total zinc-based particles in the anode comprises 100 wt. % zinc fines of −325 mesh size, the mean average particle size of the total zinc-based particles, for example, can be about 35 microns. It will be appreciated that the mean average particle sizes as given above are representative of the given mixtures and can vary somewhat depending on the specific particle size distribution within each fraction.

The inclusion of zinc fines in the anode has been determined to improve overall performance of zinc/nickel oxyhydroxide cells at both high and low drain rates for a given size cell. It is theorized that the addition of zinc fines increases the total surface area of the zinc-based particles in the anode. Nickel oxyhydroxide cathodes are well known to have excellent high drain rate capability. The greater total surface area of a mixture of zinc-based particles containing zinc fines can improve overall rate capability of the zinc anode thereby providing a better match with the nickel oxyhydroxide cathode, thereby improving overall cell performance.

A preferred mode of operation for the zinc/nickel oxyhydroxide cell of the invention has the total zinc-based particles in the anode comprising zinc with at least a portion of the total zinc-based particles including larger zinc particles, that is, larger than zinc fines. Although the total zinc-based particles in the anode can be comprised entirely of zinc fines or of essentially no zinc fines, it has been determined to be desirable for the total zinc-based particles in the anode to comprise a mixture of both zinc fines and larger zinc particles. Such a mixture can provide excellent overall cell performance with respect to rate capability for a broad spectrum of discharge requirements and also provide good storage characteristics for both fresh and partially discharged cells.

Another preferred mode of operation of the cell of the invention has been determined to have the total zinc-based particles in the anode comprise both at least 10 percent by weight zinc fines and also at least about 10 percent by weight of larger zinc particles. Desirably, the total zinc-based particles in the anode comprise between about 10 and 80 percent by weight zinc fines, for example, between about 30 and 70 percent by weight zinc fines, with the remainder being larger zinc particle. Cells comprising larger size zinc-based particles can exhibit less gassing when stored in the fresh un-discharged state than cells comprising 100 percent zinc fines. In this regard, the presence of larger zinc particles can serve to improve the long term storage characteristics of a cell in the fresh (i.e., non-discharged state). The zinc fines may be of 200 mesh size or smaller, that is, a size sufficiently small so that they will pass through a 200 mesh size sieve (i.e., a sieve having square openings of 0.075 mm). Preferably, the zinc fines are of 325 mesh size or smaller, that is, a size sufficiently small that they will pass through a 325 mesh size sieve (i.e., a sieve having square openings of 0.045 mm). Thus, desirably, the total zinc-based particles in the anode may comprise between about 10 and 80 percent by weight, for example, between about 30 and 70 percent by weight of −325 mesh zinc fines, with the remainder being larger zinc-based particles.

The zinc particle size distribution can appear as having a unimodal, bimodal or multimodal statistical distribution when plotted to reflect a frequency distribution versus particle size. Various modal size distributions of zinc-based particles are described in commonly assigned U.S. Pat. No. 6,521,378.

The cathode can comprise nickel oxyhydroxide, preferably in the form of a plurality of compacted slabs, disks, pellets or rings. The cathode slabs, disks, pellets or rings have a circumferential shape to match the shape of the cell housing, for example, in the case of a cylindrical housing, the cathode slabs, disks or pellets are preferably cylindrical. Each cathode slab, disk or pellet has a central hollow core running in the direction of its thickness. The resulting rings are inserted so that they are stacked one on top of another. The rings are aligned along the longitudinal axis of the cell, so that the outside surface of each ring is in contact with the inside surface of the cell housing. The stacked cathode rings include a central hollow cavity running along longitudinal axis of the cell which contains the anode. The inside surface of each cathode ring preferably is curved. Such a curved surface improves the mechanical strength of the cathode ring during transfer and handling and also provide uniform contact between the separator and the cathode. The separator is inserted into the central hollow cavity such that the outer surface of the separator abuts and closely contacts the inner surface of the cathode. A gelled anode slurry comprising zinc-based particles is added into the anode cavity such that the separator is located at the interface between the anode and the cathode. The cell end cap assembly has an elongated anode current collector, i.e., a nail, which is inserted into the anode slurry and is electrically connected to the negative terminal of the cell. The end cap assembly also includes an insulating sealing member, which electrically isolates the anode current collector from the cell housing.

Another preferred mode of operation of the cell of the invention has been determined to have a cathode including an electrically conductive additive capable of enhancing the bulk electrical conductivity of the cathode. Examples of suitable electrically conductive additives include carbon particles, nickel powder, cobalt powder, cobalt oxide, cobalt oxyhydroxide, carbon fibers, carbon nanofibers or combinations thereof. Carbon nanofibers are described, for example, in commonly assigned U.S. Ser. No. 09/658,042, filed Sep. 7, 2000 and U.S. Ser. No. 09/829,709, filed Apr. 10, 2001. More particularly, the cathode can include between 2 wt. % and 20 wt. %, or between 5 wt. % and 15 wt. %, or between 6 wt. % and 8 wt. % of conductive carbon particles. Conductive carbon particles can include graphitized carbon, carbon black, petroleum coke or acetylene black. Preferably, the conductive carbon is a graphitized carbon. Graphitized carbon can include natural graphite, synthetic graphite, expanded graphite, graphitized carbon black or mixtures thereof. For example, conductive carbon particles can include from 10 to 90 percent by weight natural or synthetic graphite and from 90 to 10 percent by weight expanded graphite. Conductive carbon particles can have a wide variety of shapes including substantially spherical, elongated or needle-like having one dimension substantially longer than the others, flake-like having two dimensions elongated relative to a third, or fibrous or thread-like. Generally, both natural and synthetic graphite particles can have a flake-like shape.

In an alkaline cell including nickel oxyhydroxide as the active cathode material, it is preferable to use a graphite that is resistant to oxidation by nickel oxyhydroxide. During storage of cells at high temperatures, nickel oxyhydroxide can oxidize graphite directly. Thus, use of an oxidation-resistant graphite in cathodes including nickel oxyhydroxide can minimize such undesirable processes. A suitable graphite can include from 10 to 90 wt. % oxidation-resistant graphite.

The relative oxidation resistance of a particular graphite is determined by many contributing factors. For example, it is believed that the rate of graphite oxidation is at least partially related to the specific surface area of the graphite particles whereby the smaller the surface area, the more oxidation-resistant the graphite. Similarly, oxidation resistance of a graphite can be at least partially related to the average particle size and the particle size distribution. Because larger size particles typically can have lower surface areas, they can be more oxidation-resistant. Also, oxidation resistance is believed to be at least partially related to the average crystallite size of the graphite as determined by x-ray diffraction, whereby the larger the crystallite size, the more oxidation-resistant the graphite. Further, it is believed that oxidation resistance also can depend, at least partially, on the relative number of surface defects present in the graphite particles. Specifically, the fewer the surface defects, the more oxidation-resistant the graphite. Typically, an oxidation resistant graphite can be made by heat-treating a high purity synthetic or natural graphite in an inert atmosphere at high temperatures, for example, at temperatures greater than about 2500° C. or greater than about 3000° C.

In one aspect, an alkaline primary cell includes a cathode, an anode, a separator between the anode and the cathode and an alkaline electrolyte contacting the anode and the cathode. The cathode preferably includes an oxidation-resistant graphite and an active cathode material comprising a nickel oxyhydroxide. The anode includes zinc or zinc alloy particles, of which preferably at least about 10 wt. % are 200 mesh size or smaller.

In another aspect, a method for improving discharge performance of an alkaline battery after storage at high temperatures includes providing a positive electrode including an active cathode material including nickel oxyhydroxide and a conductive additive including an oxidation-resistant graphite, providing a zinc electrode including zinc or zinc alloy particles, of which at least about 10 wt. % are 200 mesh size or smaller, and forming a cell including the cathode and anode.

A zinc/nickel oxyhydroxide cell can have improved capacity retention of discharge performance after storage at high temperature. Good performance at both high and low drain rates can be obtained by including zinc fines in the anode. By including conductive carbon particles, such as graphite, at a higher level in the cathode, the capacity of a nickel oxyhydroxide cell discharged at a low drain rate can be increased by increasing the efficiency of the cathode. More advantageously, alkaline cells can include a combination of an anode including zinc fines and a cathode including both nickel oxyhydroxide and an oxidation-resistant graphite, thereby providing very good performance characteristics after storage. Specifically, addition of zinc fines to the anode of a zinc/nickel oxyhydroxide cell can improve performance at both high and low drain rates after extended storage at high temperatures. Further, the particular combination of zinc fines in the anode with nickel oxyhydroxide and an oxidation-resistant graphite in the cathode can provide cells having improved stability during storage as well as improved discharge performance without further modifying either anode or cathode, such as by changing the compositions or by introducing other additives or dopants.

Thus, in addition to the large improvement in performance afforded by adding zinc fines to the zinc in the anode, the continuous and intermittent discharge capacities of both fresh and stored Zn/NiOOH cells of the invention are increased even further by substituting an oxidation-resistant graphite for the natural graphite in the cathode. (Preferably, the oxidation resistant graphite can also be used beneficially as a coating for the cell housing inside surface.) The combination of oxidation-resistant graphite in the cathode and zinc fines in the anode of the Zn/NiOOH cells of the invention is theorized to be particularly effective at delaying onset of polarization of the zinc anode when the Zn/NiOOH cell is discharged at high drain rates either continuously or intermittently, especially after storage for prolonged periods of time at a high temperature before discharge. That is, the delay in onset of polarization of the zinc anode, which in turn results in additional improved cell performance, is a direct result of use in the present invention of the combination of zinc fines in the anode together with the oxidation resistant graphite in the cathode. (For added benefit the cell housing inside surface may also be coated with the oxidation resistant graphite.) More specifically, the combination of use of zinc fines in the anode together with the oxidation resistant graphite in the cathode increases both continuous and intermittent discharge capacities of both fresh cells and cells which are stored for periods of time, for example, up to one year and even longer.

An improvement in overall cell performance is believed to result from an improvement in electrical conductivity between the zinc-based particles and the anode current collector. Unexpectedly, when zinc fines are included in the anode of a cell with a cathode including nickel oxyhydroxide as the active material, discharge performance under low drain conditions also was improved. An improvement in performance was obtained without substantially increasing the total design capacity of the cell. In addition, by including a relatively high level of an oxidation-resistant graphite in a cathode including nickel oxyhydroxide, improved discharge performance after storage at high temperature can be obtained. Inclusion of an oxidation-resistant graphite at a higher level either alone or in combination with other conductive additives, for example, an electrically conductive metal or a semiconductive metal oxide, such as niobium-doped tin oxide, indium-tin oxide, fluoride-doped tin oxide, fluoride-doped indium oxide, oxygen-deficient tin oxide, aluminum-doped zinc oxide, niobium-doped titanium dioxide or combinations thereof, can further improve cell performance. Specifically, the improvement in performance resulting from increasing the level of conductive additives is most apparent for continuous discharge at high drain rates.

Other features and advantages of the invention will be apparent from the description and drawing, and from the claims.

DESCRIPTION OF DRAWING

The FIGURE is a cross-section view of a representative cylindrical alkaline cell of the invention having a cathode comprising nickel oxyhydroxide and an anode comprising zinc-based particles.

DETAILED DESCRIPTION

Referring to the FIGURE, battery 10 includes a cathode 12 (positive electrode), an anode 14 (negative electrode), a separator 16 and a cylindrical housing 18. Battery 10 also includes current collector 20, insulating plug 22, and a negative metal end cap 24, which serves as the negative terminal for the battery. The housing 18 has a cylindrical body 49, an open end 25 and an opposing closed end 45. An end cap assembly 50 is inserted into the open end 25 of housing 18. The peripheral edge 46 of housing 18 is crimped over a portion of end cap assembly 50 thereby closing said open end. The end cap assembly 50 comprises an insulating plug 22, current collector 20, negative end cap 24, and a metal support disk 60 between end cap 24 and insulating plug 22. Current collector 20 is inserted through a central opening in the insulating plug 22 and the top end 20a of the current collector is welded to end cap 60. As end cap assembly 50 is inserted into the housing open end 25, the current collector tip end 20b penetrates into anode 14. The housing peripheral edge 46 is crimped over the edge of metal support disk 60 with the peripheral edge of insulating plug 22 therebetween. The end cap assembly 50 thus becomes firmly secured to the housing with support disk 60 in radial compression. The end cap 24 is insulated from housing 18 by a paper or plastic washer 30. End cap 24 is in electrical contact with anode 14 through anode current collector 20 and thus forms the cell's negative terminal. The cathode 12 is in contact with the housing 18 and a portion of the housing, typically at the bottom closed end thereof, forms the positive terminal 40. Insulating plug 22 is a plastic member preferably containing a rupturable diaphragm or membrane (not shown) integrally formed therein as described, for example, in U.S. Pat. No. 3,617,386. The membrane forms a thin region within insulating plug 22 and is designed to rupture should gas within the cell rise to a high level, for example, above about 100 psig, typically between about 200 and 500 psig.

Cathode 12 has an annular structure with an outer surface in electrical contact with the inner surface of housing 18, which also serves as the cathode current collector and the positive external battery terminal. Cathode 12 can include an active cathode material, conductive carbon particles, and electrolyte solution. Optionally, cathode 12 also can include an oxidative additive, a binder or both. Cathode 12 can be formed by stacking multiple smaller slabs, disks, pellets or rings 12a which can be die cast or compression molded. Alternatively, cathode 12 can be formed by extrusion through a nozzle to form a single continuous cathode 12 having a hollow core. Cathode 12 can also be formed of a plurality of rings 12a with hollow core, wherein each ring is extruded into housing 18.

An electrolytic solution is dispersed throughout battery 10. Battery 10 can be, for example, an AA, AAA, AAAA, C or D size cylindrical battery. Alternatively, battery 10 can be a prismatic, laminar or thin battery, or a coin or button cell.

Anode 14 can be formed of any of the zinc-based materials conventionally used in zinc battery anodes. For example, anode 14 can be a zinc slurry that can include zinc or zinc alloy particles, a gelling agent, and minor amounts of additives, such as a gassing inhibitor. In addition, a portion of the electrolyte solution can be dispersed throughout the anode. The zinc-based particles can be any of the zinc-based particles conventionally used in zinc slurry anodes. The anode can include, for example, between 60 wt. % and 80 wt. %, between 63 wt. % and 75 wt. %, or between 67 wt. % and 71 wt. % of zinc-based particles. The zinc-based particles can be small size zinc-based particles, such as zinc fines or zinc dust. A zinc-based particle can be formed of, for example, zinc or a zinc alloy. Preferred zinc-based particles are essentially both mercury-free and lead-free. Metals that can be alloyed with zinc to provide zinc-based particles preferably include those that can inhibit gassing, such as indium, bismuth, aluminum, and mixtures thereof. As used herein, gassing refers to the evolution of hydrogen gas resulting from a reaction of zinc metal with the electrolyte. The presence of hydrogen gas inside a sealed battery is undesirable because a pressure buildup can cause leakage of electrolyte. Generally, a zinc-based particle formed of a zinc alloy is greater than 75 wt. % zinc, typically greater than 99.9 wt. % zinc. The term zinc or zinc powder as used herein shall be understood to include zinc alloy powder which comprises a high concentration of zinc and as such functions electrochemically essentially as pure zinc.

Anode 14 preferably includes zinc fines which are mixed with zinc-based particles having a larger average particle size. One convenient measure of the amount of zinc fines in the total zinc particles is the percentage by weight of the total zinc particles which pass through a sieve of 200 mesh size. Thus, as used herein "zinc fines" are zinc-based particles small enough to pass through a 200 mesh sieve. The reference mesh size is a Tyler standard mesh size commonly used in the industry and corresponds to a U.S. Standard sieve having a square 0.075 mm opening. (Tables are available to convert a specific Tyler mesh sizes to square openings in millimeters as reported in the U.S.A. Standard Screen Specification ASTME—11 specification.) The following is an abbreviated conversion table.

TABLE A

| Sieve - Sq. Opening, mm | Tyler Standard |
| --- | --- |
| 0.850 | 20 mesh |
| 0.250 | 60 mesh |
| 0.150 | 100 mesh |
| 0.106 | 150 mesh |
| 0.075 | 200 mesh |
| 0.063 | 250 mesh |
| 0.045 | 325 mesh |
| 0.038 | 400 mesh |

The anode preferably comprises zinc fines which can be admixed with zinc-based particles of larger average particle size. Thus, in one aspect, the anode desirably includes at least 10 wt %, at least 15 wt %, at least 30 wt %, or at least 80 wt %, typically between 35 and 75 wt % of the total zinc or zinc alloy particles small enough to pass through a −200 mesh screen. Such zinc fines typically can have a mean average particle size between about 1 and 75 microns, for example, about 75 microns.

Even very small amounts of zinc or zinc alloy particles, for example, at least about 5 wt. % or even at least about 1 wt. % of the total zinc or zinc alloy particles which are small enough to pass through a −200 mesh screen, can produce a beneficial effect on performance of the zinc anode. (A 200 mesh size corresponds to a sieve having square openings of 0.075 mm.) Thus, as used herein "zinc fines" are zinc particles small enough to pass through a sieve of 200 mesh size. At least 25 wt. %, for example, at least 50 wt. % of the zinc or zinc alloy particles can be of larger size (−20/+200 mesh), that is, so that they will pass through a sieve between about 20 and 200 mesh size (sieve square opening of between about 0.850 mm and 0.075 mm). For example, when the total zinc in the anode comprises 10 wt. % zinc fines (batch 1) of −200 mesh size mixed with 90 wt. % larger size zinc particles (batch 2) between −20 and +200 mesh size, the mean average particle size of the total zinc particles can, for example, be about 340 microns. When the total zinc in the anode comprises 50 wt. % zinc fines (batch 1) of −200 mesh size mixed with 50 wt. % larger size zinc particles (batch 2) of between −20 and +200 mesh size, the mean average particle size of the total zinc particles can, for example, be about 200 microns. When the total zinc in the anode comprises 100 wt. % zinc fines of −200 mesh size, the mean average particle size of the total zinc particles can, for example, be about 75 microns. However, the −200 mesh zinc fines of the cells of the anodes of the present invention, also can have a broader mean average particle size, for example, between about 1 and 75 microns.

It will be appreciated that although the zinc fines preferably can form a portion of the total zinc-based particles in the anode, this is not intended to exclude the possibility that a portion of the total zinc-based particles can be present in the form of agglomerated zinc particles with or without zinc fines being present. Such agglomerated zinc-based particles are disclosed in commonly assigned U.S. Pat. No. 6,300,011.

In another aspect, at least about 10 wt. %, at least 45 wt. %, or at least 80 wt. % of the zinc or zinc alloy particles can pass through a sieve of 325 mesh size (sieve square opening of 0.045 mm). (The mean average particle size of a batch of zinc-based particles capable of passing through a 325 mesh size sieve can typically be between about 1 and 35 micron, for example, about 35 micron. Thus, it should be appreciated that a portion of such batch may be comprised of some very small zinc-based particles in the range from 1 to 35 micron, for example between about 5 and 35 micron, for example, between about 5 and 25 micron size.) Even very small amounts, for example, at least about 5 wt. % or even at least about 1 wt. % of the total zinc or zinc alloy particles which are small enough to pass through a 325 mesh size screen, can produce a beneficial effect on the performance of cells having cathodes including nickel oxyhydroxide. At least 25 wt. %, for example at least 50 wt. % of the zinc or zinc alloy particles can be larger, for example, so that they will pass through a sieve between about 20 and 200 mesh size (sieve square opening of between about 0.850 mm and 0.075 mm). For example, when the total zinc-based particles in the anode comprises 10 wt. % zinc fines (batch 1) of −325 mesh size mixed with 90 wt. % larger size zinc particles (batch 2) between 20 and 200 mesh size, the mean average particle size of the total zinc particles may for example, be about 314 microns. (The mean average particle size of the −325 mesh zinc fines may typically be between about 1 and 35 micron.) When the total zinc-based particles in the anode comprises 50 wt. % zinc fines (batch 1) of 325 mesh size mixed with 50 wt. % larger size zinc particles (batch 2) of between 20 and 200 mesh size, the mean average particle size of the total zinc particles can, for example, be about 125 microns. When the total zinc-based particles in the anode comprises 70 wt. % zinc fines (batch 1) of −325 mesh size mixed with 30 wt. % larger size zinc particles (batch 2) of between 20 and 200 mesh size, the mean average particle size of the total zinc-based particles can, for example, be about 50 microns. When the total zinc-based particles in the anode comprises 100 wt. % zinc fines of −325 mesh size, the mean average particle size of the total zinc-based particles may typically be between about 1 and 35 micron, for example, about 35 microns.

Particle size as reported herein shall be construed as determined by the more common method employed currently in the art for determining particle size, namely, by laser diffraction and using the Fraunhofer algorithm for computing the volume distribution of particle sizes and the corresponding mean average. The term average particle size as used herein and in the claims, unless otherwise specified, shall be understood to be the mean average based on a distribution of particle size versus volume percent. The laser diffraction method is described, for example, by M. Puckhaber and S. Rothele, in "Laser Diffraction—Millennium Link for Particle Size Analysis", Powder Handling and Processing, Vol. 11, No. 1, January/March 1999. This method measures particle size in terms of a mapped spherical equivalent. For example, in the case of an acicular shaped particle, the mapped sphere can be visualized as the sphere resulting from the particle being rotated around its central axis which is at the center of and perpendicular to the long side of the particle.

Another, somewhat less accurate, traditional method for determining particle size is the sieve method. A graphical plot of particle size, y, versus cumulative volume percent, x, can be obtained from passing the total particle mixture through a series of stacked sieves so that the sieve having the largest openings (smaller mesh size) is at the top and sieves having progressively smaller openings (larger mesh size) are located towards the bottom of the stack. The volume percent, x, of particles retained between each pair of sieves is computed and associated with an average particle size, y, determined by the screen sizes. The mean average particle size can be calculated as an integral y(dx)/100, that is, the area under the plot divided by the base, 100 volume percent. Because of better accuracy and more common usage, the average particle size reported herein is that determined using the laser diffraction method.

The zinc or zinc alloy particles can be generally acicular, defined herein as having a length along a major axis at least two times a length along a minor axis. The zinc-based particles also can be generally flake-like, each flake generally having a thickness of no more than about 20 percent of the maximum linear dimension of the particle. The inclusion of such zinc fines in the anode of the cell of the invention has been determined to improve cell performance at both high and low drain rates.

Anode 14 typically can have total mercury content less than about 100 parts per million parts (ppm) of zinc by weight, preferably less than 50 parts mercury per million parts of zinc by weight. Also, the anode preferably does not contain any added amounts of lead and thus is essentially lead-free, that is, the total lead content is less than 30 ppm, desirably less than 15 ppm of the total zinc in the anode. The anode typically can include aqueous KOH electrolyte solution, a gelling agent (e.g., an acrylic acid copolymer available under the tradename CARBOPOL C940 from B.F. Goodrich), and surfactants (e.g., organic phosphate ester-based surfactants available under the tradename GAFAC RA600 from Rhône Poulenc). Such an anode composition is presented only as an illustrative example and is not intended to restrict the present invention.

Cathode 12 can include nickel oxyhydroxide (NiOOH) as the active cathode material, conductive carbon particles, including graphite, and alkaline electrolyte solution. Optionally, the cathode also can include an oxidizing additive, a binder, or combinations thereof. Generally, the cathode can include, for example, between 60 wt. % and 97 wt. %, between 80 wt. % and 95 wt. %, or between 85 wt. % and 90 wt. % of nickel oxyhydroxide. Optionally, cathode 12 can include an admixture of two or more active cathode materials, for example, a mixture of nickel oxyhydroxide and gamma-manganese dioxide (i.e., electrolytically produced manganese dioxide or chemically produced manganese dioxide) as disclosed for example, in U.S. Pat. No. 6,566,009.

The basic electrochemical discharge reaction at the cathode can involve reduction of nickel oxyhydroxide according to the following representative reaction. However, it will be appreciated that other secondary reactions are possible as well:

$$NiOOH + H_2O + 1e^- \rightarrow Ni(OH)_2 + OH^- \qquad (Eq. 1)$$

The nickel oxyhydroxide can be prepared by a variety of synthetic methods. For example, nickel oxyhydroxide can be prepared by manually or mechanically mixing nickel hydroxide and an alkali hydroxide salt in a dry, air-free atmosphere to form a mixture. The mixture can be exposed to ozone gas at a temperature between 10 and 80° C. or between 15 and 50° C. in a suitable reaction vessel as disclosed in co-pending U.S. Ser. No. 10/086,807, filed Mar. 4, 2002, which is incorporated by reference in its entirety, to form a nickel oxyhydroxide. The ozone gas can be mixed with oxygen gas and can include sufficient water vapor to initiate the oxidation process. Excessive amounts of water vapor in the gas mixture must be avoided to minimize agglomeration of the nickel hydroxide and alkali metal hydroxide powders. The mixture can be exposed to ozone gas for less than twelve hours, for example, less than six hours or less than four hours, to produce a nickel oxyhydroxide containing little or no un-reacted nickel hydroxide.

The nickel hydroxide also can be oxidized to nickel oxyhydroxide by a variety of solution-based oxidation methods including, for example, treatment with a basic aqueous solution of sodium or potassium hypochlorite or an aqueous solution of sodium or potassium peroxydisulfate. Nickel hydroxide also can be oxidized to nickel oxyhydroxide electrolytically in an aqueous solution of an alkali metal halide salt as disclosed, for example, in U.S. patent Publication No. 2003/0186125 A1.

A suitable nickel hydroxide can consist of particles that are approximately spherical in shape (i.e., the outer surfaces of the particles approximate spheres, spheroids or ellipsoids). The nickel hydroxide can include a beta-nickel hydroxide, a cobalt hydroxide-coated beta-nickel hydroxide, an alpha-nickel hydroxide, a cobalt hydroxide-coated alpha-nickel hydroxide and mixtures thereof. Suitable nickel hydroxides can be obtained from, for example, H. C. Starck GmbH &.Co. (Goslar, Germany), Tanaka Chemical Co. (Fukui, Japan), Kansai Catalyst Co., Ltd.(Osaka, Japan) and Umicore Canada Inc.(Leduc, Alberta).

The cathode active material can include one or more nickel oxyhydroxides. The nickel oxyhydroxide can be selected from a beta-nickel (+3) oxyhydroxide, a cobalt (+3) oxyhydroxide-coated beta-nickel (+3) oxyhydroxide, a gamma-nickel (+3,+4) oxyhydroxide, a cobalt (+3) oxyhydroxide-coated gamma-nickel (+3,+4) oxyhydroxide, a solid solution of beta-nickel (+3) oxyhydroxide and gamma-nickel (+3,+4) oxyhydroxide or a cobalt (+3) oxyhydroxide-coated solid solution of beta-nickel (+3) oxyhydroxide and gamma-nickel (+3,+4) oxyhydroxide and mixtures thereof. Cobalt oxyhydroxide-coated nickel oxyhydroxide particles can include a cobalt oxyhydroxide coating that can enhance inter-particle electrical contact between nickel oxyhydroxide particles in the cathode. The cobalt oxyhydroxide coating can cover, for example, at least 60%, at least 70%, at least 80% or at least 90% of the surface of the nickel oxyhydroxide particles. Cobalt oxyhydroxide-coated nickel oxyhydroxide can be prepared from nickel hydroxide coated with between 2% and 15% by weight, between 3% and 10% by weight or between 4% and 6% by weight of cobalt hydroxide. The cobalt oxyhydroxide coating can include an optional dopant. The dopant can be selected from sodium, magnesium, calcium, strontium, barium, scandium, yttrium, lanthanum, rare earth elements, titanium, zirconium, hafnium, chromium, manganese, nickel, copper, silver, zinc, cadmium, aluminum, gallium, indium, bismuth or combinations thereof. The nickel oxyhydroxide also can include an optional bulk dopant, typically in a solid solution. The bulk dopant can be selected from aluminum, manganese, cobalt, zinc, gallium, indium or combinations thereof. The bulk dopant can be present at a relative weight percentage of less than 10%, less than 5% or less than 2%.

The nickel oxyhydroxide can consist of particles that are approximately spherical in shape (i.e., the outer surfaces of the particles approximate spheres, spheroids or ellipsoids). Preferably, the nickel oxyhydroxide includes essentially non-fractured spherical particles. The nickel oxyhydroxide can have mean average particle sizes ranging from, for example, 2 to 50 microns, 5 to 30 microns, 10 to 25 microns or 15 to 20 microns. Suitable commercial beta-nickel oxyhydroxides and cobalt oxyhydroxide-coated beta-nickel oxyhydroxides can be obtained from, for example, Kansai Catalyst Co. (Osaka, Japan), Tanaka Chemical Co. (Fukui, Japan), H.C. Starck GmbH & Co. (Goslar, Germany), or Umicore-Canada Inc., (Sherwood Park, Alberta).

Cathode 12 can include an optional oxidizing additive. Such an additive is reduced more readily than the nickel oxyhydroxide and can serve as a sacrificial additive. That is, the oxidizing additive can help to stabilize the nickel oxyhydroxide and improve the storage characteristics of the cell. Examples of oxidizing additives include sodium hypochlorite, sodium peroxydisulfate, potassium peroxydisulfate, potassium ferrate, potassium permanganate, barium permanganate, barium ferrate, silver permanganate, and silver oxide.

Cathode 12 can include an optional binder. Examples of suitable binders include polymers such as polyethylene, polypropylene, polyacrylamide, or a fluorocarbon resin, for example, polyvinylidene difluoride or polytetrafluoroethylene. A suitable polyethylene binder is sold under the trade name COATHYLENE HA-1681 (available from Hoechst). The cathode can include, for example, between 0.05% and 5% by weight or between 0.1% and 2% by weight of binder. A portion of the electrolyte solution can be dispersed throughout cathode 12, and the weight percentages provided above and below are determined after the electrolyte solution has been so dispersed.

Cathode 12 can include conductive carbon particles, which can be present in an admixture with nickel oxyhydroxide to improve bulk electrical conductivity of the cathode. More particularly, the cathode can include between 2 wt. % and 12 wt. % or between 4 wt. % and 10 wt. % or between 6 wt. % and 8 wt. % of conductive carbon particles.

Conductive carbon particles can include graphitized carbon, carbon black, petroleum coke or acetylene black. Preferred conductive carbon particles are highly graphitized. Graphitized carbon can include natural graphite, synthetic graphite, expanded graphite, graphitized carbon black or a mixture thereof. The natural or synthetic graphite can be an oxidation-resistant graphite. Preferably, the conductive carbon particles comprise from 10 to 100 percent by weight, for example between about 10 and 90 percent by weight oxidation-resistant graphite. Graphitized carbon can include graphitic carbon nanofibers alone or in an admixture with natural, synthetic or expanded graphite. Such mixtures are intended to be illustrative and are not intended to restrict the invention.

A preferred graphite for use as a conductive additive in cathodes including nickel oxyhydroxide is an oxidation-resistant graphite. It is well known to include an oxidation-resistant graphite as a conductive additive in the cathode of rechargeable nickel-cadmium (Ni—Cd) and nickel metal hydride (Ni—MH) cells having pasted positive electrodes as disclosed in U.S. Pat. Nos. 5,500,309; 5,451,475; 6,210,833; 6,617,072 and U.S. application Publication No. 2003/0232247 A1. During electrochemical charging of the beta-nickel hydroxide in pasted nickel electrodes of Ni—Cd and Ni-MH cells to form beta-nickel oxyhydroxide according to Eq. 2, the nickel electrode also can evolve oxygen gas via oxidation of the electrolyte according to Eq. 3. Oxygen evolution typically takes place during charging at elevated temperatures and also during over-charging, for example, of sealed Ni—MH cells.

$$Ni(OH)_2 + OH^- \rightarrow NiOOH + H_2O + e^- \quad \text{(Eq. 2)}$$

$$2OH^- \rightarrow H_2O + \tfrac{1}{2}O_2 + 2e^- \quad \text{(Eq. 3)}$$

It is believed that the evolved oxygen gas, especially in the case of sealed Ni—MH cells, can promote oxidation of graphite as shown in Eq. 4.

$$C + O_2 \rightarrow CO_2 \quad \text{(Eq. 4)}$$

$$CO_2 + 2KOH \rightarrow K_2CO_3 + H_2O \quad \text{(Eq. 5)}$$

Oxidation of the graphite in the cathode can decrease cathode conductivity. In the case of a sealed cell, the carbon dioxide generated (Eq.4) can dissolve in the alkaline electrolyte to form carbonate ions according to Eq. 5. An increase in the concentration of carbonate ions in the electrolyte can produce a decrease in ionic conductivity and can adversely affect cell performance. In the case of a zinc/nickel oxyhydroxide primary cell wherein the nickel oxyhydroxide was charged chemically prior to inclusion in the cell, open circuit voltage is sufficiently high to promote oxidation of electrolyte during storage of the cell according to Eq. 6.

$$2NiOOH + H_2O \rightarrow 2Ni(OH)_2 + \tfrac{1}{2}O_2 \quad \text{(Eq. 6)}$$

Thus, oxidation of electrolyte by nickel oxyhydroxide represents a parasitic self-discharge process that can result in decreased capacity, especially after prolonged cell storage. Oxidation of electrolyte by electrochemically-charged nickel electrodes also can contribute to the poor shelf life of charged Ni-MH cells, for example. During storage of cells at high temperatures, it is believed that nickel oxyhydroxide can oxidize graphite particles directly. Use of an oxidation-resistant graphite in cathodes including nickel oxyhydroxide and graphite can minimize undesirable self-discharge processes thereby improving post-storage performance of cells. Desirably, the graphite can include from 10 to 90 wt. % of an oxidation-resistant graphite.

An oxidation-resistant graphite typically is prepared by treating a synthetic graphite at very high graphitization temperatures (e.g., >2500° C.) in an inert atmosphere. It is believed that treating a synthetic graphite or high purity natural graphite at a high graphitization temperature for an extended period of time can produce a graphite having a higher degree of crystallinity, larger average crystallite size, fewer surface defects, lower specific surface area, and higher chemical purity (i.e., lower ash content). A maximum ash content of less than about 0.1% by weight is desirable, less than about 0.05% by weight is more desirable. In particular, the oxidation-resistance of such a heat-treated graphite is believed to result from many contributing factors. For example, it is believed that the rate of graphite oxidation is at least partially related to the specific surface area of the graphite particles. The specific surface area can be calculated from the adsorption isotherm for nitrogen gas at 77K using the Brunauer-Emmett-Teller (B.E.T.) equation. See, for example, S. Brunauer, P. H. Emmett, E. Teller, J. Phys. Chem., 60, 309(1938). The smaller the total surface area, the more resistant the graphite particles to oxidation. A suitable oxidation-resistant graphite has a B.E.T. specific surface area less than 20 m²/g, preferably less than 15 m²/g, more preferably less than 10 m²/g. Similarly, oxidation resistance can be at least partially related to average graphite particle size and particle size distribution. Because larger size particles typically can have lower surface areas, they can be more resistant to oxidation. The greater the fraction of small particles in the particle size distribution, the less resistant the graphite to oxidation. However, the average particle size of an oxidation-resistant graphite must be sufficiently small to form an electrically conductive network inside the cathode, whereby the graphite particles are in intimate contact with both nickel oxyhydroxide particles and other graphite particles. An oxidation-resistant graphite can have a mean average particle size between about 3 and 30 microns, preferably between about 5 and 20 microns.

It is also believed that oxidation resistance of graphite is at least partially related to the average crystallite size of the graphite particles. Natural graphite is well known to consist of two distinct crystallographic phases, a hexagonal phase and a rhombohedral phase. See, for example, H. O. Pierson, "Handbook of Carbon, Graphite, Diamond, and Fullerenes", p. 43, Noyes Publications, Park Ridge, N.J. (1993). The hexagonal phase is thermodynamically more stable than the rhombohedral phase and hence, is the predominant form for both natural and synthetic graphite. See, for example, J. D. Bernal, Proc. Roy. Soc. London, Ser. A, 106, 749(1924). The crystal structure of the hexagonal phase is composed of individual unit cells having hexagonal symmetry. The base of the hexagonal unit cell has sides that are equal in length and separated by 120° and define a plane. This hexagonal basal plane defines the "a" axis direction of the graphite crystal structure. The basal plane contains carbon atoms bonded to each other in hexagonal arrays to form "graphene" planes. In the graphite crystal structure, the graphene planes overlie one another and are held together by van der Waals attractions. In the case of the hexagonal phase, designated "2H", alternating graphene planes are arranged in an ABA stacking sequence. By comparison, the graphene layers of the rhombohedral structure, designated "3R", are arranged in an ABCA stacking sequence. See, for example, H. Lipson and A. R. Stokes, Proc. Roy. Soc. London, Ser. A, 181, 101(1943). The height of the hexagonal unit cell in the direction of the "c" crystal axis corresponds to the perpendicular distance between basal planes of the unit cell as well as twice the distance between adjacent graphene layers. Thus, the size of a crystallite can be defined as the distance the hexagonal unit cell repeats along the "a" and "c" crystal axis directions before the axes abruptly change their orientation. Although the unit cell parameters for a particular type of graphite are constant, the number of unit cells along the "a" and "c" axis directions can vary. Thus, the crystallite size of a graphite can be defined in terms of a distance, designated as $L_a$, corresponding to the total number of repeats of the unit cell in the "a" axis direction, and a distance, designated as $L_c$, corresponding to the total number of repeats of the unit cell in the "c" axis direction. The values of unit cell parameters, "a" and "c", and the average crystallite sizes $L_c$ and $L_a$ can be determined from x-ray powder diffraction patterns. Typically, average values for the "c" unit cell parameter and average crystallite size, $L_c$, along the c axis direction are calculated from the position of the strong 002 Bragg diffraction peak or alternatively, the weaker 004 peak, using the Debye-Scherrer equation. The 002 peak lattice spacing ($d_{002}$), is the distance between adjacent equivalent graphene planes and can be used as an indicator of the degree of graphite crystallinity. As the average value of $d_{002}$ approaches that of an ideal graphite crystal (viz., 3.354 Å) the degree of crystallinity increases. Suitable oxidation-resistant graphites have an average value of $d_{002}$ from about 3.355 to 3.358 Å. A desirable value for the average value of $d_{002}$ is less than 3.356 Å. Typically, the average values for the "a" unit cell parameter and the crystallite size, $L_a$ can be calculated from the position of the 100 Bragg diffraction peak using the Warren-Bodenstein equation. See, for example, B. E. Warren, P. Bodenstein, Acta Crystal., 20, 602(1966). The values for $L_c$ and $L_a$ also can be calculated from electron diffraction patterns of the graphite. However, the values calculated from electron diffraction patterns can be influenced greatly by stacking faults and other lattice distortions. Typical values for average crystallite sizes $L_a$ and $L_c$ calculated from x-ray diffraction patterns of a natural graphite range from about 1000 Å to 3000 Å. A minimum crystallite size $L_a$ greater than about 100 Å to 300 Å is required to ensure adequate bulk electrical conductivity in the cathode of an alkaline cell. Suitable oxidation-resistant graphites can have average crystallite size $L_a$ greater than about 1500 Å and $L_c$ greater than about 1000 Å. An average crystallite size, $L_a$ greater than about 2000 Å and $L_c$ greater than about 1500 Å is desirable. It is believed that the larger the average $L_c$ and $L_a$ crystallite sizes, the more oxidation resistant the graphite.

Without being bound by any particular theory it is believed that the oxidation resistance of a graphite also can be related to the relative fraction of rhombohedral phase present in the particular graphite. As disclosed in U.S. Pat. No. 5,554,462, the relative fraction of rhombohedral phase can be determined from the ratio of the integrated areas for the 101 Bragg diffraction peak of the rhombohedral phase to the sum of the areas for the 101 peaks of the rhombohedral and hexagonal phases. The area of the peak for the rhombohedral phase is typically multiplied by a correction factor as shown in Eq. 7.

$$R = \text{Area}_{Rhomb}(101) \times 1.25 / (\text{Area}_{Hexag}(101) + \text{Area}_{Rhomb}(101) \times 1.25)$$ (Eq. 7)

The relative fraction of rhombohedral phase has been reported to increase as a graphite is mechanically milled to a smaller average particle size. See, for example, C. Natarajan, H. Fujimoto, A. Mabuchi, K. Tkumitsu, T. Kasuh, J. Power Sources, 92, 187(2001). It is hypothesized that an increase in the relative fraction of rhombohedral phase corresponds to an overall increase in lattice defects, thereby decreasing oxidation resistance. Thus, it is desirable that a graphite have a rhombohedral phase fraction of less than about 25% or less than about 10%.

Further, it is believed that oxidation resistance can depend at least partially on the relative number of surface defects or dislocations present in the graphite particles. Laser micro-Raman spectroscopy has been used previously in the art to detect the presence of surface defects in graphite. The first order laser Raman spectrum for a typical natural graphite typically exhibits two absorption bands including a sharp, intense band centered at about 1570-1580 cm$^{-1}$ and a broader, weak band at about 1330 to 1360 cm$^{-1}$. These bands correspond to the well-known "G" and "D" bands, respectively, and have been attributed to graphitic sp$^2$ bonding in the graphene planes. The "D" band is believed to be associated with structural disorder at the surface the particle and typically is absent for single crystal graphite. Specifically, the "D" band has been attributed to a vibrational mode originating from a distortion of the hexagonal lattice near the edges of crystallites. See, for example, M. Nakamizo, H. Honda, M. Inagaki, Carbon, 16(4), 281(1978). The ratio of the normalized intensity or alternatively, the integrated area under the peak, of the "D" band to that of the "G" band can be correlated to the relative number of defects in the graphite crystal lattice. See, for example, J.-N. Rouzard and A. Oberlin, Carbon, 27, 517(1989). A typical value for defect ratio of a pristine synthetic graphite is about 0.05. The presence of even a rudimentary "D" band in the Raman spectrum indicates the presence of surface defects. For example, mechanical milling of a commercial graphite powder to reduce average particle size can increase the defect ratio as surface defects are created. See, for example, C. Natarajan, H. Fugimoto, A. Mabuchi, K. Tokumitsu, T. Kasuh, J. Power Sources, 92, 187(2001). Thus, smaller graphite particles typically can have a larger defect ratio than larger particles of the same graphite. Oxidation-resistant graphites can have relatively low defect ratios. According to an empirical relationship reported by Tuinstra and Koenig (See, J. Chem. Phys., 53, 1126(1979)), the defect ratio (i.e., ratio of intensities of the "D" and "G" bands) is inversely proportional to average crystallite size in the "a" axis direction, $L_a$, as shown in Eq. 7.1.

$$L_a = 44 * [I_D/I_G]^{-1}$$ (Eq. 7.1)

Thus, the larger the crystallite size and the fewer the surface defects of a graphite, the higher the oxidation resistance. Suitable oxidation-resistant graphites can have a defect ratio less than about 0.15, preferably less than about 0.1.

Suitable oxidation-resistant synthetic graphites are available commercially under the trade designation "TIMREX SFG" from Timcal America Co. (Westlake, Ohio). SFG-type graphites suitable for use in an admixture with nickel oxyhydroxide in the cathode of the cell of the invention include SFG44, SFG15, SFG10, and SFG6. Particularly preferred oxidation resistant synthetic graphites include TIMREX® SFG10 and SFG15. (The number appearing after the SFG designation refers to the $d_{90}$ particle size which is defined as follows: 90 volume percent of the particles have a particle size in microns less than the indicated number as determined by the laser diffraction method. For example, SFG10 graphite has a $d_{90}$ particle size of about 10 micron. It should be noted that the average particle size typically can be substantially smaller.) Other suitable oxidation-resistant synthetic graphites are available under the trade designations TIMREX® SLP50 and SLX50.

A suitable oxidation-resistant, heat-treated natural graphite is available, for example, under the trade designation 2939 APH-M from Superior Graphite (Chicago, Ill.). This oxidation resistant graphite has properties and provides performance comparable to oxidation-resistant synthetic graphites.

A suitable oxidation-resistant graphite, for example, as selected from the above listed TIMREX SFG, SLP or SLX powders can be dispersed in an organic solvent or water including a surfactant or dispersing aid and applied in a continuous layer to the inside surface of cell housing 18. Such a coated layer is conductive after drying and can improve electrical contact between cathode 12 and housing 18 which serves as the cathode current collector. Such an oxidation-resistant conductive coating can maintain good electrical conductivity between a cathode containing nickel oxyhydroxide and housing 18, and help to delay the onset of polarization of the zinc anode, especially after storage at high temperatures or after storage for periods of time at ambient temperature, for example, up to a year and longer. Thus, such coating improves the cell's overall performance.

Anode 14 comprises zinc alloy powder between about 60 wt % and 80 wt %, between 62 wt % and 75 wt %, preferably between about 62 and 72 wt % of zinc particles. Preferably the zinc alloy powder comprises between about 62 to 72 wt % (99.9 wt % zinc containing indium containing 200 to 500 ppm indium as alloy and plated material), an aqueous KOH solution comprising 35.4 wt % KOH and about 2 wt % ZnO; a cross-linked acrylic acid polymer gelling agent available commercially under the tradename "CARBOPOL C940" from B.F. Goodrich (e.g., 0.5 to 2 wt %) and a hydrolyzed polyacrylonitrile grafted onto a starch backbone commercially available under the tradename "Waterlock A-221" from Grain Processing Co. (between 0.01 and 0.5 wt. %); organic phosphate ester surfactant RA-600 or dionyl phenol phosphate ester surfactant available under the tradename RM-510 from Rhone-Poulenc (between 100 and 1000 ppm). The term zinc as used herein shall be understood to include zinc alloy powder which comprises a very high concentration of zinc, for example, at least 99.9 percent by weight zinc. Such zinc alloy material functions electrochemically essentially as pure zinc.

With respect to anode 14 of the alkaline cell 10 of the invention, the zinc particles may be any zinc particles conventionally used in alkaline cell zinc anodes. The zinc powder mean average particle size is desirably between about 1 and 350 micron, desirably between about 1 and 250 micron, preferably between about 20 and 250 micron. The anode desirably includes zinc fines. The term zinc fines as used herein are zinc particles that have dimensions suitable to pass through a standard 200 mesh screen in a normal sieving operation, that is, when the sieve is shaken by hand. The zinc-based particles can be nominally spherical or nonspherical in shape. Nonspherical particles can be acicular in shape (i.e., having a length along a major axis at least two times a length along a minor axis) or flake-like in shape (i.e., having a thickness no more than 20 percent of the maximum linear dimension).

For example, the anode desirably comprises zinc fines in an amount such that at least 10 wt. %, at least 15 wt. %, at least 30 wt. %, or between 35 and 75 wt. % of the zinc or zinc alloy particles are of 200 mesh size or smaller. For example, at least about 10 wt. %, at least 45 wt. %, or at least 80 wt. % of the zinc or zinc alloy particles can be of 325 mesh size. Preferably at least 25 wt. %, for example at least 50 wt. % of the zinc or zinc alloy particles are between about 20 and 200 mesh size (sieve square opening of between about 0.850 mm and 0.075 mm). The zinc or zinc alloy particles are preferably acicular, having a length along a major axis at least two times a length along a minor axis, or the particles can be generally flake-like, each flake generally having a thickness of no more than about 20 percent of the maximum linear dimension of the particle.

The basic electrochemical reaction taking place at the anode upon cell discharge is:

$$Zn \rightarrow Zn^{+2} + 2e^- \qquad (Eq.\ 8)$$

$$Zn^{+2} + 2OH^- \rightarrow ZnO + H_2O \qquad (Eq.\ 9)$$

The bulk density of the zinc in the anode by way of a non-limiting example may desirably be between about 1.75 and 2.2 grams zinc per cubic centimeter of anode. The percentage by volume of the aqueous electrolyte solution in the anode may typically range between about 69.2 and 75.5 percent by volume of the anode.

The cell 10 can be balanced in the conventional manner so that the ratio of the capacity (i.e., in mA-hr) of nickel oxyhydroxide (based on 292 mA-hr per gram NiOOH) divided by the capacity (i.e., in mA-hr) of zinc (based on 820 mA-hr. per gram zinc) is about 1. However, the cell also can be balanced such that the nickel oxyhydroxide is in excess. For example, the cell can be balanced such that total the theoretical capacity of the nickel oxyhydroxide divided by the total theoretical capacity of the zinc can be between about 1 and 1.5 or as high as about 2.0. Such a cell balance can reduce the amount of hydrogen gassing and cell bulging. Because the gassing rate for a zinc/NiOOH cell of the invention can be less than that for a zinc/MnO$_2$ cell of the same size and type (e.g., AA). Thus, a zinc/NiOOH cell can be balanced such that the ratio of the capacity (i.e., in mA-hr) of the nickel oxyhydroxide to the capacity (i.e., in mA-hr) of zinc is about 1 even with zinc present in excess, for example, between about 0.8 and 1.0.

Zinc-based particles suitable for use in the Zn/NiOOH cells of the invention can be produced by any known manufacturing process for preparing fine zinc particles including gas atomization, impulse atomization, melt spinning, and air blowing. The zinc-based particles can be sorted by sieving, air classification or any other known method to produce various particle size distributions that can be mixed in suitable proportions to produce a desired particle size distribution. Alternatively, the average particle size of the zinc-based particles, as produced, can be controlled as well as the particle size distribution, to produce a desired statistical distribution of particle sizes including a significant proportion of very small zinc-based particles. Typically, the average size of the zinc-based particles can be relatively small. Zinc-based particles can have an average size of less than about 175 microns, preferably less than about 150 microns, more preferably less than about 120 microns.

One of the effects of including significant proportions of very small zinc-based particles in the distribution is an increase in the total surface area (i.e., the aggregate surface area) of the zinc-based particles in the anode. This is due to the inherent relationship between particle surface area and particle volume: namely that, for particles of similar shape, decreasing the average particle size increases the ratio of average surface area to volume of the particles. Specific surface areas of zinc-based particles can be determined from multipoint nitrogen adsorption isotherms measured by the B.E.T. method as described, for example, by P. W. Atkins (See "Physical Chemistry", 5$^{th}$ ed., New York: W. H. Freeman & Co., 1994, pp. 990-2). It is believed that a high measured value of specific surface area can at least partially account for the substantially improved performance demonstrated by zinc/nickel oxyhydroxide cells of the invention. Total surface area of zinc-based particles can be varied by controlling the production process or subsequent processing of the zinc-based particles.

Preferably, at least a portion of the total zinc in the anode of Zn/NiOOH cells comprises zinc fines. Zinc fines can be defined as zinc-based particles having dimensions suitable to pass through a standard 200 mesh screen (i.e., −200 mesh) in a normal sieving operation, such as when a sieve is shaken by hand. Zinc dust can be defined as zinc-based particles having dimensions suitable to pass through a standard 325 mesh screen (i.e., −325 mesh) in a normal sieving operation. The zinc-based particles can be nominally spherical or nonspherical in shape. Non-spherical zinc-based particles can be acicular in shape (i.e., having a length along a major axis at least two times a length along a minor axis) or flake-like in shape (i.e., having a thickness no more than 20 percent of the maximum linear dimension). Particle-to-particle interactions among the zinc-based particles of the anode can provide good cell performance characteristics, especially those characteristics related to discharge performance, for example, under high drain rates. This is particularly evident when the cathode includes nickel oxyhydroxide. It is believed that the particle-to-particle connectivity between large zinc-based particles and zinc fines and zinc dust is improved resulting in higher electrical conductivity at weight percentages of fine zinc particles of 50% or less. An improvement in interparticle connectivity also can produce an increase in the stability or yield point of the gelled zinc anode, thereby providing improved tolerance for mechanical shock including decreased tap load voltage instability and increased drop voltage stability for alkaline batteries having anodes including such zinc-based fine particles. See, for example, U.S. Pat. No. 6,284,410, which is incorporated by reference in its entirety.

Preparation of Zinc Particle Mixtures

The zinc-based particle mixture included in anode 14 as described herein preferably includes at least a portion of zinc fines, that is, zinc particles having dimensions sufficiently small so that they can pass through a standard 200 mesh sieve. Such a mixture of zinc-based particles can be made conveniently by mixing a batch 1 of 200 mesh (or smaller) fines with a batch 2 of larger zinc particles, for example, zinc particles between about 20 and 200 mesh. That is, the larger particles of batch 2 would pass through a 20 mesh sieve and be retained on a 200 mesh sieve. A mixture consisting of an admixture of the zinc fines of batch 1 and the larger zinc particles of batch 2 can be characterized as having a bimodal distribution when the zinc particle size distribution is plotted to reflect a frequency distribution of weight percent zinc versus particle size.

Further, the size distribution for the mixture of zinc-based particles including both zinc fines and larger zinc particles also can be characterized as having a unimodal distribution. This could occur, for example, if the zinc mixture was prepared by mixing a batch of zinc fines with a second batch of much larger zinc particles and with a third batch of zinc particles having a continuous size distribution pattern between that of the fine particles and very large particles. In such a case, the maximum in the unimodal distribution for the mixture of batches could appear between that for the fines and the large particles. Thus, it is not intended to limit the zinc mixture comprising zinc fines and larger zinc-based particles, to a bimodal or a multi-modal particle size distribution, since such a mixture could also appear to have a particle size distribution which could be characterized as unimodal. Size distributions of mixtures of zinc-based particles can be determined and represented in the manner disclosed in U.S. Pat. No. 6,284,410 and in W. F. Hess, "Evaluation and Representation of Particle Size Distributions", Powder Handling and Processing, Vol. 14, No.2, April/June 2002, pp. 102-108.

In the context of suitable zinc anodes for the Zn/NiOOH cell of the invention, the zinc-based particles can have a multi-modal particle size distribution, for example, one of the modes can have an average particle size of from 15 microns to 120 microns, from 30 microns to 40 microns or from 95 microns to 105 microns and another mode may typically be comprised of larger zinc particles. For zinc-based particles in a mode having an average particle size between about 30 microns and 40 microns, at least 90 volume percent of the zinc-based particles can have a particle size between about 5 microns and 100 microns, and at least 75 volume percent of the zinc-based particles can have a particle size between about 15 microns and 75 microns. For zinc-based particles in a mode having an average particle size of between about 95 microns and 105 microns, at least 90 volume percent of the zinc-based particles can have a particle size between about 15 microns and 200 microns, and at least 75 volume percent of the zinc-based particles can have a particle size between about 25 microns and 140 microns. Another mode of the zinc-based particles can have an average particle size between about 200 microns and 330 microns. For example, the average particle size of this mode can be between about 290 microns and 300 microns. For this mode, at least 90 volume percent of the particles can have a particle size between about 50 microns and 850 microns, and at least 75 volume percent of the particles can have a particle size between about 100 microns and 550 microns. For zinc-based particles having a multi-modal distribution and including zinc-based particles having different particle morphologies, more than one mode can be formed of non-spherical particles, with each mode being more or less non-spherical than the other the modes. Alternatively, one mode can be formed of nominally spherical zinc-based particles, while another mode can be formed of non-spherical zinc-based particles, for example, flake-like or acicular particles. For zinc-based particles having a multi-modal distribution of particle compositions, one mode can be formed of zinc-based particles having one composition, while another mode can be formed of zinc-based particles having another composition. For example, one mode can include zinc-based particles formed of zinc and a certain amount of one or more metals combined in an alloy that can inhibit gassing such as, for example, bismuth and indium, whereas another mode can include zinc-based particles formed of zinc and different relative amounts of one or more metals that can inhibit gassing such as, for example, bismuth and indium.

For zinc-based particles having a multi-modal distribution of particle compositions, one mode can include zinc-based particles formed of zinc, 500 parts per million (ppm) indium relative to zinc and 500 ppm bismuth relative to zinc. Alternatively, this mode can include zinc-based particles formed of zinc, 350 ppm indium relative to zinc and 150 ppm bismuth relative to zinc. For zinc-based particles having a multi-modal distribution of particle compositions, yet another mode can include zinc-based particles formed of zinc, 150 ppm indium relative to zinc and 230 ppm bismuth relative to zinc.

Mixtures of zinc-based particles can include as little as 1% by weight to 10% by weight of zinc fines. Alternatively, the mixtures of zinc-based particles can include at least 10% by weight, preferably at least 50% by weight, and more preferably at least 80% by weight zinc fines. In some embodiments, 100% by weight of the zinc-based particles can be zinc fines. High levels of performance also can be achieved by the Zn/NiOOH cells of the invention, as described more fully herein, when a significant proportion of the zinc-based particles in the anode comprises zinc fines or zinc dust. In addition to zinc-based particles, the anode also includes gelling agents, surfactants, gassing inhibitors, electrolyte, and other optional performance enhancing additives.

Gelling agents can include, for example, a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid include CARBOPOL 940 and 934 (available from B.F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between, between 0.05% and 2% by weight, or between 0.1% and 1% by weight of gelling agent.

A gassing inhibitor can include a metal, such as bismuth, tin, indium, aluminum or a mixture or alloy thereof. A gassing inhibitor also can include an inorganic compound such as a metal salt, for example, an indium or bismuth salt or a mixture thereof. Alternatively, a gassing inhibitor can include an organic compound, such as a phosphate ester, an ionic surfactant or a nonionic surfactant. Examples of suitable ionic surfactants are disclosed, for example, in U.S. Pat. No. 4,777,100, incorporated by reference in its entirety.

The electrolyte can be an aqueous solution of an alkali metal hydroxide, such as potassium hydroxide, sodium hydroxide, lithium hydroxide or mixtures thereof. The electrolyte can contain between 15 wt. % and 60 wt. %, between 20 wt. % and 55 wt. %, or between 30 wt. % and 50 wt. % of the alkali metal hydroxide dissolved in water. The electrolyte can contain from 0 wt. % to 6 wt. % of a metal oxide, such as zinc oxide. The introduction of electrolyte into the cell can be assisted by application of vacuum, thereby assisting electrolyte penetration into pores of the cathode and separator. Application of vacuum during cell assembly can improve cell performance substantially.

Separator 16 can be a conventional battery separator. In some embodiments, separator 16 can be formed of two layers of non-woven, non-membrane material with one layer being disposed along a surface of the other. For example, to minimize the volume of separator 16 while providing an efficient cell, each layer of non-woven, non-membrane material can have a basic weight of 54 grams per square meter, a thickness of 5.4 mils when dry and a thickness of 10 mils when wet. The layers can be substantially devoid of fillers, such as inorganic particles. In other embodiments, separator 16 can include a layer of cellophane combined with a layer of non-woven material. The separator also can include an additional layer of non-woven material. The cellophane layer can be adjacent to cathode 12 or anode 14. The non-woven material can contain from 78 wt. % to 82 wt. % polyvinyl alcohol and from 18 wt. % to 22 wt. % rayon with a trace amount of a surfactant, such as non-woven material available from PDM under the trade name PA25. The separator also can include a microporous membrane optionally combined with or laminated to one or more layers of a non-woven material.

Housing 18 can be a conventional battery housing fabricated from metal, such as, for example, nickel-plated cold-rolled steel, commonly used for primary alkaline batteries. The housing can include an inner conductive metal wall and an outer electrically non-conductive layer such as a heat shrinkable plastic. A layer of an electrically conductive material can be disposed between the inner wall of housing 18 and cathode 12. The conductive layer can be disposed on the inner surface of housing 18, along the circumference of cathode 12 or both. The conductive layer can be formed, for example, of a carbonaceous material (e.g., colloidal graphite), such as LB1000 (Timcal), Eccocoat 257 (W.R. Grace & Co.), Electrodag 109 (Acheson Colloids Company), Electrodag EB-009 (Acheson), Electrodag 112 (Acheson) and EB0005 (Acheson). However, a conductive layer including an oxidation resistant graphite is preferred. Suitable methods for applying the conductive layer are disclosed in, for example, Canadian Patent No. 1,263,697, incorporated by reference in its entirety.

An anode current collector 20 passes through seal 22 extending into anode 14 and can be made from a suitable metal, such as brass or brass plated steel. The upper end of current collector 20 electrically contacts negative metal top cap 24. Seal 22 can be made, for example, of nylon.

The following Examples relate to alkaline primary batteries including a cathode comprising a nickel oxyhydroxide and an oxidation-resistant graphite, and an anode comprising zinc fines. For each example, the total energy output of a fresh cell was determined at a specific constant power drain rate and the energy output of an identical fresh cell was determined at a specific intermittent power drain rate. The Performance Index was calculated as follows.

Cell Performance Index

The relative performance of an electrochemical cell can be evaluated by different test methods depending on the intended application, for example, primarily for high power or primarily for low power applications. Thus, the performance of a cell can be evaluated by discharging the cell continuously at at preset low, medium or high drain rates. The performance of a cell also can be evaluated by subjecting the cell to intermittent or pulsed discharge at constant current or constant power at various drain rates. For example, in a typical intermittent discharge test, a cell can be discharged for a specific period of time (e.g., several seconds to minutes) at a specified high drain rate, then immediately discharged for a specific period of time at a lower drain rate, next allowed to rest, and the discharge cycle repeated until a specified cut off voltage is reached. Such an intermittent or pulsed discharge test can be used to estimate service life of a cell under intermittent usage in a device. The continuous and intermittent test results can be used in the aggregate to characterize overall cell performance and also to determine the effect of, for example, modifying anode or cathode composition, electrolyte composition, cell balance or introducing additives on cell performance.

When a cell is discharged continuously at constant current or constant power, polarization of an electrode can take place, especially at high drain rates. The deleterious effect of polarization on cell performance has already been discussed herein. Polarization can arise from various sources, for example, any process that limits mobility of ions within the electrode, active material or electrolyte. This can result in reduced cell service life. In a typical intermittent discharge test, during pauses between the periods of high drain, ions can have sufficient time to diffuse and replenish the ions near the electrode surface, thereby reducing the extent of polarization. Thus, it will be appreciated that the total energy output (i.e., Watt-hrs) of a cell tested intermittently at a high drain rate, for example, 1 watt (i.e., discharged intermittently at 1 Watt) will generally be greater than that for the same cell discharged at a constant drain rate of 1 watt to the same cut-off voltage.

A "Performance Index" can be defined which can be used to characterize the overall cell performance based on the aggregate cell performance in both continuous and intermittent discharge test regimes. Thus, a higher value for the performance index is indicative of better overall cell performance. The performance index, designated as "PI", can be defined as follows:

$$PI = [X_{cont}/X_{int} + X_{int}/D]/2 \quad \text{(Eq. 10)}$$

Where:
PI=performance index
$X_{cont}$=capacity (Watt-hrs) for continuous discharge at a specified constant power drain rate
$X_{int}$=capacity (Watt-hrs) for intermittent discharge at a specified drain rate (i.e., same as for $X_{cont}$) and duty cycle
D=design capacity of the cell (i.e., theoretical capacity, in watt-hrs, based on the limiting cell capacity)

As noted above, the value of $X_{int}$ is typically greater than that for $X_{cont}$ and less than that for D. As the value for $X_{cont}$ approaches that for $X_{int}$, it is believed that the influence of electrode polarization on cell performance is decreased. As the value for $X_{int}$ approaches the theoretical capacity, D, it is believed that cell efficiency (i.e., utilization of anode and cathode active materials) increases. Thus, as will be appreciated from Eq. 10, the maximum value for performance index, PI, can be obtained (viz., for a combination of continuous and intermittent discharge tests at comparable drain rates), when both the value of $X_{cont}$ approaches that of $X_{int}$ and the value of $X_{int}$ approaches the value of D.

The following test protocol can be applied to the evaluation of the performance index for zinc/nickel oxyhydroxide as well as for zinc/manganese oxide cells. Typically, continuous and intermittent tests are conducted at high power drain rates suitable for a particular cell chemistry and size. It is believed that the extent of polarization should be greatest at high drain rates. The specific continuous and intermittent discharge tests can be varied, but a preferred procedure for evaluating an alkaline cell is as follows:

The value for $X_{cont}$ (in watt-hrs) can be determined by discharging a fresh cell at a constant power drain rate of 1 watt until a specified cut-off voltage, for example, 0.9 Volts is reached. The value for $X_{int}$ (in watt-hrs) can be determined by discharging a fresh cell at a suitable intermittent power drain rate, for example, at a drain rate of 1 watt for a period of 3 seconds, followed immediately by a drain rate of 0.1 watt for 7 seconds, and then the cycle repeated until a specified cut-off voltage, for example, 0.9 Volts is reached. Along with the known design capacity, D, the values for $X_{cont}$ and $X_{int}$ can be used to calculate the performance index according to Eq. 10.

A "fresh" cell for the purpose of evaluating performance index, unless otherwise specified, is defined herein as a cell evaluated within the time period beginning with the fourth day and ending with the fifteenth day after cell manufacture. It is believed that various internal chemical processes of an alkaline cell achieve a quasi-steady state within about three days after manufacture and that it is desirable to wait for at least this period of time before beginning performance testing. Further, it shall be understood that the term "performance index" as used herein and in the claims, unless otherwise specified, is derived from results of cell performance tests performed within the time period beginning on the fourth day and ending on the fifteenth day after cell manufacture. Unless otherwise specified, it shall be understood that all cells were stored at ambient room temperature during the time period before testing.

EXAMPLES

The following specific examples demonstrate the performance of cylindrical AA size (13.7 mm×47.3 mm) alkaline test cells of the invention compared with the performance of AA size cells with conventional zinc-based anodes and nickel oxyhydroxide cathodes containing natural graphite. Test cells of the invention include an anode comprising a mixture of zinc fines and conventional zinc-based powder and a cathode comprising nickel oxyhydroxide and an oxidation-resistant graphite.

To evaluate relative performance, fresh test cells of each Example and Comparative Example were discharged continuously and intermittently at the indicated constant power drain rates for the indicated duty cycles. The total energy output (in Watt-hrs) was measured and the corresponding performance index values calculated. Specifically, for each Example and Comparative Example, fresh test cells were discharged continuously at a 1 Watt drain rate until the cell voltage decreased to 0.9 Volt and the total energy output was recorded (Table 4). Identical fresh test cells were discharged intermittently at a 1 Watt drain rate for 3 seconds followed immediately by discharge at a 0.1 Watt drain rate for 7 seconds and then this cycle repeated until the cell voltage decreased to 0.9 Volt and the total energy output recorded. Performance index values were calculated as described hereinabove and are summarized in Table 4.

Three slightly different cathode formulations were used to prepare mixtures for the fabrication of cathodes for the test cells of the Examples and Comparative Examples. These cathode formulations are designated as "formulation A", "formulation B", and "formulation C" and are given in Table 1.

TABLE 1

Cathode Formulations

| Component | Formulation A (wt %) | Formulation B (wt %) | Formulation C (wt %) |
|---|---|---|---|
| NiOOH[1] | 87 | 85 | 85 |
| Natural graphite[2] | 6 | 8 | 0 |
| Oxidation-resistant graphite[3] | 0 | 0 | 8 |
| Polyethylene binder[4] | 1 | 1 | 1 |
| Electrolyte solution[5] | 6 | 6 | 6 |

Notes:

TABLE 1-continued

Cathode Formulations

| Component | Formulation A (wt %) | Formulation B (wt %) | Formulation C (wt %) |
|---|---|---|---|

[1]The NiOOH powder is comprised primarily of beta-nickel (+3) oxyhydroxide having a mean average particle size of about 19 microns. The NiOOH particles have a surface coating of cobalt oxyhydroxide in the total amount of about 4 percent by weight of the pure NiOOH. Thus, the actual amount of active NiOOH comprised about 85/1.04 = 81.7 percent by weight of the cathode. The cobalt oxyhydroxide-coated beta-nickel oxyhydroxide is available from Kansai Catalyst Co., Ltd. (Osaka, Japan).
[2]Graphite NdG-0507 is a natural graphite having an average particle size of about 7 microns, a BET surface area of about 10 m$^2$/g, a crystallite size, Lc >200 nm, and is available from Nacional de Grafite (Itapecerica, MG Brazil).
[3]Graphite Timrex ® SFG15 is a synthetic oxidation-resistant graphite having an average particle size of about 9 microns, a BET surface area of about 9.5 m$^2$/g, a crystallite size, Lc >100 nm, and is available from Timcal-America (Westlake, OH).
[4]Polyethylene binder under the trade designation "Coathylene" from Hoechst Celanese.
[5]The electrolyte solution contains 38% by weight of dissolved KOH and about 2% by weight of dissolved zinc oxide.

The nickel oxyhydroxide was a cobalt oxyhydroxide coated beta-nickel oxyhydroxide. A typical cobalt oxyhydroxide coated beta-nickel oxyhydroxide had the following nominal composition: NiOOH 90.2 wt %; CoOOH 6.6 wt %, NaOH 1.5 wt %, moisture 1.6 wt %.

Three different anode formulations were used to prepare anode slurries for the test cells of the Examples and the Comparative Examples. The anode formulations, of which one contained only relatively large zinc-based particles (−20/+200 mesh), one contained 50 wt. % zinc fines (−325 mesh), and another contained 70 wt. % zinc fines (−325 mesh) are designated as "formulation D", "formulation E", and "formulation F", respectively, and are summarized in Table 2. In anodes with formulation E, a mixture of zinc fines and larger zinc-based particles was prepared by mixing a batch 1 of the zinc fines with a batch 2 of the larger zinc-based particles in a weight ratio of batch 1 to batch 2 of about 1 to 1. The mean average particle size of the resulting mixture was about 125 microns. In anodes having formulation F, a mixture of zinc fines and larger zinc-based particles was prepared by mixing a batch 1 of the zinc fines with a batch 2 of the larger zinc-based particles in a weight ratio of about 7 to 3. The mean average particle size of the resulting mixture was about 50 microns.

TABLE 2

Anode Formulations

| Component | Formulation D (wt %) | Formulation E (wt %) | Formulation F (wt %) |
|---|---|---|---|
| Large Particle Zinc[1] (−20/+200 mesh) | 64.00 | 32.00 | 19.20 |
| Zinc fines[2] (−325 mesh) | 0 | 32.00 | 44.80 |
| Gelling agent 1[3] | 0.522 | 0.522 | 0.522 |
| Gelling agent 2[4] | 0.036 | 0.036 | 0.036 |
| Surfactant[5] | 0.107 | 0.107 | 0.107 |
| Gassing inhibitor[6] | 0.029 | 0.029 | 0.029 |
| Electrolyte[7] | 35.306 | 35.306 | 35.306 |

Notes:
[1]Zinc-based particles having a mean average particle size of about 370 microns and were alloyed and plated with indium to give a total indium content of about 350 ppm.
[2]Zinc-based particles having a mean average particle size of about 35 microns and were alloyed and plated with indium to give a total indium content of about 700 ppm.

TABLE 2-continued

Anode Formulations

| Component | Formulation D (wt %) | Formulation E (wt %) | Formulation F (wt %) |
|---|---|---|---|

[3]A polyacrylic acid-based gelling agent available under the tradename Carbopol 940 from B. F. Goodrich Co.
[4]A grafted starch-based gelling agent available under the tradename Waterlock A221 from Grain Processing Corp.
[5]An organic phosphate ester-based surfactant available in the form of a 3 wt % solution under the tradename RM 510 from Rhône Poulenc.
[6]Indium acetate added as an inorganic gassing inhibitor.
[7]The electrolyte solution contained 35.4% by weight of dissolved KOH and about 2% by weight of dissolved zinc oxide.

The specific combinations of anode formulation and cathode formulation used to prepare the anodes and cathodes for the test cells of the Examples and Comparative Examples are summarized in Table 3.

TABLE 3

Compositions of Test Cells

| Test Cells | Cathode Formulation | Anode Formulation | Can Coating Type |
|---|---|---|---|
| Comparative Ex. 1 | A | D | Standard |
| Comparative Ex. 2 | B | D | Standard |
| Example 1 | B | E | Standard |
| Example 2 | C | E | Standard |
| Example 3 | C | F | Standard |
| Example 4 | C | F | Oxidation-resistant |

Comparative Example 1

Test cells of AA size were fabricated having an anode of formulation D and a cathode of formulation A. Thus, the anode did not contain any zinc fines and the cathode contained 6 wt. % natural graphite. The capacities of the anode and cathode were balanced such that the theoretical capacity of the NiOOH (based on 292 mA-hr per gram NiOOH) divided by the theoretical capacity of the zinc (based on 820 ma-hr per gram zinc) was about 0.76. The cathode contained about 8 grams of NiOOH (i.e., pure basis).

Fresh test cells were discharged continuously at 1 Watt until cell voltage decreased to 0.9 Volt. Total energy output was 1.27 Watt-hrs corresponding to a service life of 1.27 hours (Table 5). Other fresh test cells were discharged intermittently at 1 Watt for 3 seconds followed immediately by 0.1 Watt for 7 seconds and the cycle repeated until cell voltage decreased to 0.9 Volt. Total energy output was 2.21 Watt-hrs corresponding to a service life of 5.95 hours (Table 5). The performance index for fresh test cells of Comparative Example 1 was 0.62. Other test cells were discharged intermittently at 1 Watt for 10 seconds immediately followed by a 1 minute rest period, this cycle repeated for 1 hour, then followed by 6 hours of rest, and the entire cycle repeated until cell voltage decreased to a pre-determined voltage and the service life reported (Table 5).

The same discharge tests were repeated using test cells stored for 1 week at 60° C. before discharge at room temperature. The total energy output was 0.635 Watt-hrs for fresh cells discharged continuously at 1 Watt and 0.958 Watt-hrs for cells discharged intermittently at 1 Watt. This corresponds to service life values of 0.62 hours for continuous and 2.58 hours for intermittent discharge at 1 Watt. The performance index for stored test cells of Comparative Example 1 was 0.47. Other stored test cells were discharged intermittently at 1 Watt for 10 seconds immediately followed by a 1 minute rest period, this cycle repeated for 1 hour, then followed by 6 hours of rest, and the entire cycle repeated until cell voltage decreased to a pre-determined voltage and the service life reported (Table 5).

Comparative Example 2

Test cells of AA size were fabricated having an anode of formulation D and a cathode of formulation B. The anode did not contain any zinc fines and the cathode contained 8 wt. % natural graphite. The capacities of the anode and cathode were balanced such that the theoretical capacity of the NiOOH (based on 292 mA-hr per gram NiOOH) divided by the theoretical capacity of the zinc (based on 820 mA-hr per gram zinc) was about 0.75. The cathode contained about 8 grams NiOOH (i.e., on a pure basis).

Fresh test cells were discharged continuously at 1 Watt until cell voltage decreased to 0.9 Volt. Total energy output was 1.13 Watt-hrs. Other fresh test cells were discharged intermittently at 1 Watt for 3 seconds followed immediately by 0.1 Watt for 7 seconds and the cycle repeated until cell voltage decreased to 0.9 Volt. Total energy output was 2.28 Watt-hrs. The performance index for the test cells of Comparative Example 2 was 0.61.

The same discharge tests were repeated using test cells stored for 1 week at 60° C. before discharge at room temperature. The total energy output for cells discharged continuously at 1 Watt was 0.76 Watt-hrs and for cells discharged intermittently at 1 Watt was 1.15 Watt-hrs. The performance index for the stored test cells of Comparative Example 2 was 0.51.

Example 1

Test cells of AA size were fabricated having an anode of formulation E and a cathode of formulation B. The amounts of NiOOH and natural graphite in the cathode, total zinc in the anode, and the cell balance were the same as for Comparative Example 2. However, the anode included 50 wt. % zinc fines (i.e., −325 mesh).

Fresh test cells were discharged continuously at 1 Watt until cell voltage decreased to 0.9 Volt. Total energy output was 1.31 Watt-hrs corresponding to a service life of 1.31 hours. Other fresh test cells were discharged intermittently at 1 Watt until cell voltage decreased to 0.9 Volt. Total energy output was 2.34 Watt-hrs corresponding to a service life of 6.28 hours. The performance index for fresh test cells of Example 1 was 0.65. Other test cells were discharged intermittently at 1 Watt for 10 seconds immediately followed by a 1 minute rest period, this cycle repeated for 1 hour, followed by 6 hours of rest, and the entire cycle repeated until cell voltage decreased to a pre-determined voltage and the service life reported (Table 5).

The same discharge tests were repeated using test cells stored 1 week at 60° C. before discharge. Total energy output was 1.18 Watt-hrs for cells discharged continuously at 1 Watt and 1.81 Watt-hrs for cells discharged intermittently at 1 Watt. Corresponding service life values were 1.18 hours for continuous and 4.85 hours for intermittent discharge at 1 Watt. The performance index value for stored cells of Example 1 was 0.61. Other stored test cells were discharged intermittently at 1 Watt for 10 seconds immediately followed by a 1 minute rest period, this cycle repeated for 1 hour, then followed by 6 hours of rest, and the entire cycle repeated until cell voltage decreased to a pre-determined voltage and service life reported (Table 5).

Example 2

Test cells of AA size having an anode of formulation E and a cathode of formulation C were fabricated. The amounts of NiOOH and graphite in the cathode and total zinc in the anode were the same as used in the test cells of Example 1. The anode contained 50 wt. % zinc fines and an oxidation-resistant synthetic graphite was substituted for the natural graphite in the cathode.

Fresh test cells were discharged continuously at 1 Watt until cell voltage decreased to 0.9 Volt. Total energy output was 1.53 Watt-hrs. Other fresh test cells were discharged intermittently at 1 Watt until cell voltage decreased to 0.9 Volt. Total energy output was 2.24 Watt-hrs. The performance index for fresh test cells of Example 2 was 0.71. The same tests were repeated using test cells stored for 1 week at 60° C. before discharge at room temperature. Total energy output was 1.30 Watt-hrs for cells discharged continuously at 1 Watt and 1.94 Watt-hrs for cells discharged intermittently at 1 Watt. The performance index for stored test cells of Example 2 was 0.66.

Example 3

Test cells of AA size having an anode of formulation F and a cathode of formulation C were fabricated. The amounts of NiOOH and graphite in the cathode and total zinc in the anode were the same as used in the test cells of Example 2. In addition to the oxidation-resistant graphite in the cathode, the anode included 70 wt. % zinc fines (i.e., −325 mesh).

Fresh test cells were discharged continuously at 1 Watt until cell voltage decreased to 0.9 Volt. Total energy output was 1.76 Watt-hrs. Other fresh test cells were discharged intermittently at 1 Watt until cell voltage decreased to 0.9 Volt. Total energy output was 2.23 Watt-hrs. The performance index for fresh test cells of Example 3 was 0.76. The same tests were repeated using test cells stored for 1 week at 60° C. before discharge at room temperature. The total energy output was 1.40 Watt-hrs for stored cells discharged continuously at 1 Watt and 1.91 Watt-hrs for cells discharged intermittently at 1 Watt. The performance index for stored test cells of Example 3 was 0.68.

Example 4

Test cells of AA size having an anode of formulation F and a cathode of formulation C were fabricated. The amounts of NiOOH and graphite in the cathode and total zinc in the anode were the same as used in the test cells of Example 2. However, in addition to oxidation-resistant synthetic graphite in the cathode, the can coating also contained oxidation-resistant synthetic graphite, and the anode included 70 wt. % zinc fines.

Fresh test cells were discharged continuously at 1 Watt until cell voltage decreased to 0.9 Volt. Total energy output was 1.82 Watt-hrs. Other fresh test cells were discharged intermittently at 1 Watt until cell voltage decreased to 0.9 Volt. Total energy output was 2.38 Watt-hrs. The performance index for fresh test cells of Example 4 was 0.78. The same tests were repeated using test cells stored for 1 week at 60° C. before discharge at room temperature. Total energy output was 1.66 Watt-hrs for cells discharged continuously at 1 Watt and 2.06 Watt-hrs for cells discharged intermittently at 1 Watt. The performance index for stored test cells of Example 4 was 0.74.

TABLE 4

Performance Index

Capacity to 0.9 V (W-hrs)

| | Theoret. | Cont. 1 Watt | Intermit. 1 Watt | Performance Index |
|---|---|---|---|---|
| Cells tested FRESH | | | | |
| Comparative Ex. 1 | 3.30 | 1.27 | 2.21 | 0.62 |
| Comparative Ex. 2 | 3.18 | 1.13 | 2.28 | 0.61 |
| Example 1 | 3.18 | 1.31 | 2.34 | 0.65 |
| Example 2 | 3.03 | 1.53 | 2.24 | 0.71 |
| Example 3 | 3.03 | 1.76 | 2.23 | 0.76 |
| Example 4 | 3.03 | 1.82 | 2.38 | 0.78 |
| Cells tested AFTER STORAGE for 1 week at 60° C. | | | | |
| Comparative Ex. 1 | 3.30 | 0.625 | 0.958 | 0.47 |
| Comparative Ex. 2 | 3.18 | 0.76 | 1.15 | 0.51 |
| Example 1 | 3.18 | 1.18 | 1.81 | 0.61 |
| Example 2 | 3.03 | 1.30 | 1.94 | 0.66 |
| Example 3 | 3.03 | 1.40 | 1.91 | 0.68 |
| Example 4 | 3.03 | 1.66 | 2.06 | 0.74 |

The effect of the three different anode formulations (Table 2) having different amounts of zinc fines and the three different cathode formulations (Table 1) having different graphite types and levels on discharge performance was evaluated for freshly prepared Zn/NiOOH AA test cells, and for cells stored for one week at 60° C. before discharge. Fresh test cells of Comparative Example 2 having 8 wt. % natural graphite and no zinc fines showed little or no improvement in capacity when discharged either continuously or intermittently at 1 Watt compared to test cells of Comparative Example 1 having 6 wt. % natural graphite and no zinc fines. However, the test cells of Comparative Example 2 stored for 1 week at 60° C. before discharge had continuous and intermittent discharge capacities nearly 20% greater than the test cells of Comparative Example 1. Thus, increasing the graphite level in the cathode, e.g., from 6 to 8 wt. %, can improve post-storage performance of Zn/NiOOH cells.

Addition of 50 wt. % zinc fines to test cells of Example 1 including 8 wt. % natural graphite increased both continuous and intermittent discharge capacities of stored cells of Example 1 by 55-57% compared to cells of Comparative Example 2 without zinc fines. The performance index for the stored cells of Example 1 was much greater than that for the stored cells of Comparative Examples 1 and 2. The corresponding improvement in continuous and intermittent discharge capacities for fresh cells of Example 1 was not nearly as great. Further, the performance index (Table 4) for fresh cells of Example 1 was greater than that for fresh cells of Comparative Examples 1 and 2. The combined effect of adding 50 wt. % zinc fines to the anode and increasing graphite level to 8 wt. % in the cathode was greatest for cells stored one week at 60° C. before discharge. Both continuous and intermittent discharge capacities were increased by nearly 90% compared to the stored cells of Comparative Example 1 (Table 4).

Test cells of Example 1 and Comparative Example 1 also were evaluated further with another intermittent discharge test having longer duration 1 watt pulses and longer pauses between pulses as well as periods of time between discharge cycles. Specifically, cells were discharged at 1 Watt for 10 seconds, followed by a 1 minute pause, then the pulse/pause cycle repeated continuously for 1 hour, followed by a 6 hour rest period, and then the entire test repeated until cell voltage reached a pre-determined voltage. The service life of the fresh cells of Example 1 was nearly 35-40% greater than that of cells of Comparative Example 1 (Table 5). This percentage improvement in service life was much greater than that for fresh cells of Example 1 discharged either continuously at 1 Watt or intermittently at 1 Watt (i.e., 1 Watt for 3 seconds, 0.1 Watt for 7 seconds). Service life of stored cells of Example 1 was 60-70% greater than that of cells of Comparative Example 1. Further, the percentage improvement in service life for stored cells of Example 1 was nearly 90% for cells discharged continuously or intermittently at 1 Watt using the intermittent test with the shorter duration pulse/pause cycle (Table 5).

Replacement of the natural graphite in the test cells of Example 2 with the same amount (i.e., 8 wt. %) of an oxidation-resistant synthetic graphite, increased both continuous and intermittent discharge capacities of stored cells of Example 2 by nearly 10% compared to those of Example 1. The continuous discharge capacity of fresh cells of Example 2 increased by about 15%, whereas the corresponding intermittent discharge capacity decreased slightly. However, the performance index value increased for both fresh and stored cells of Example 2 compared to the corresponding cells of Example 1.

Increasing the percentage of zinc fines in the test cells of Example 3 from 50 wt. % to 70 wt. % while keeping the oxidation-resistant graphite level constant at 8 wt. % further increased the continuous discharge capacity of stored cells of Example 3 by 10% whereas the corresponding intermittent capacity was nearly the same as that of cells of Example 2. The continuous capacity of fresh cells of Example 3 increased by 15%, whereas the corresponding intermittent capacity was nearly the same as that of the cells of Example 2. The performance index (Table 4) increased for both fresh and stored cells of Example 3 compared to that of Example 2.

TABLE 5

Test Cell Performance

| Test Cells | Comp. Ex. 1 Service Hrs | Example 1 Service Hrs | % Gain |
|---|---|---|---|
| Cells Tested FRESH | | | |
| 1.0 Watt Continuous to 1.0 V | 1.2 | 1.31 | 9.2 |
| 1.0 Watt Continuous to 0.9 V | 1.2 | 1.31 | 9.2 |
| 1.0/0.1 Watt 3 s/7 s to 1.0 V | 5.93 | 6.24 | 5.2 |
| 1.0/0.1 Watt 3 s/7 s to 0.9 V | 5.95 | 6.28 | 5.5 |
| 1.0 Watt 10 s/m – 1 Hr/6 hr to 1.0 V | 1.75 | 2.45 | 40.0 |
| 1.0 Watt 10 s/m – 1 hr/6 hr to 0.9 V | 1.83 | 2.48 | 35.5 |
| Cells Tested AFTER 1 Week STORAGE at 60° C. | | | |
| 1.0 Watt Continuous to 1.0 V | 0.62 | 1.16 | 87.1 |
| 1.0 Watt Continuous to 0.9 V | 0.62 | 1.18 | 90.3 |
| 1.0/0.1 Watt 3 s/7 s to 1.0 V | 2.57 | 4.82 | 87.5 |
| 1.0/0.1 Watt 3 s/7 s to 0.9 V | 2.58 | 4.85 | 88.0 |
| 1.0 Watt 10 s/m – 1 Hr/6 hr to 1.0 V | 1.2 | 2.02 | 68.3 |
| 1.0 Watt 10 s/m – 1 hr/6 hr to 0.9 V | 1.28 | 2.07 | 61.7 |

Replacement of the conductive carbon in the coating applied to the inside surface of the cell housings with an oxidation-resistant synthetic graphite increased both continuous and intermittent discharge capacities of stored cells of Example 4 by 10-20% compared to the stored cells of Example 3 having a standard can coating and 70 wt. % zinc fines. The corresponding improvements in continuous and intermittent discharge capacities for fresh cells of Example 4 were Only 3-7%. Significantly, the capacities of stored cells of Example 4 discharged continuously or intermittently were 80-90% of those of fresh cells. This should be compared to capacity retention values of 40-50% for the cells of Comparative Example 1. In fact, the performance index (Table 4) increased for both fresh and stored cells of Example 4 compared to those of Example 3. Performance index values for both fresh and stored cells of Example 4 were higher than those for the test cells of any other Examples.

The Examples disclosed herein clearly demonstrate that both continuous and intermittent discharge performance of the Zn/NiOOH alkaline cells of the invention discharged after storage was improved substantially when zinc fines (e.g., 50 wt. %) were added to the anode. Increasing the percentage of zinc fines, for example, from 50 to 70 wt. % increased the capacity of both fresh and stored cells discharged continuously, but not intermittently at 1 Watt. In addition to the large improvement in performance afforded by adding zinc fines to the zinc in the anode, the continuous and intermittent discharge capacities of both fresh and stored Zn/NiOOH cells of the invention were increased even further by substituting an oxidation-resistant graphite for the natural graphite in the cathode and the can coating. The combination of oxidation-resistant graphite in the cathode and zinc fines in the anode of the Zn/NiOOH cells of the invention is theorized to be particularly effective at delaying onset of polarization of the zinc anode when the Zn/NiOOH cell is discharged at high drain rates either continuously or intermittently, especially after storage for prolonged periods of time at a high temperature before discharge. (Additional benefit may also be obtained by coating the inside surface of the cell housing with the oxidation resistant graphite.) The delay in onset of polarization of the zinc anode, which in turn results in additional improved cell performance, is a direct result of use in the present invention of the combination of zinc fines in the anode together with the oxidation resistant graphite in the cathode. More specifically, the combination of use of zinc fines in the anode together with the oxidation resistant graphite in the cathode (and optionally also using the oxidation resistant graphite as a coating for the cell housing inside surface) increases both continuous and intermittent discharge capacities of both fresh cells and cells which are stored for periods for time, for example, even up to one year and longer.

Although the invention was described with respect to various specific embodiments, it will be appreciated that other embodiments are possible and within the concept of the invention. Thus, the invention is not intended to be limited to the specific embodiments herein and is reflected by the scope of the claims.

What is claimed is:

1. A primary alkaline cell comprising a negative and a positive terminal, and an outer housing having a closed end and opposing open end, said cell further comprising an anode comprising zinc and a cathode comprising nickel oxyhydroxide within said housing, a separator between said anode and cathode, an alkaline electrolyte solution contacting said anode and cathode, and an end cap assembly sealing the open end of said housing thereby forming a boundary surface around the cell interior; wherein at least 1 percent by weight of the total zinc in the anode comprises zinc fines of dimensions suitable to pass through a standard 200 mesh sieve having square openings of 0.075 mm, wherein said cathode further comprises conductive carbon particles, said carbon particles comprising between about 10 and 100% of an oxidation resistant graphite.

2. The alkaline cell of claim 1 wherein said cell has a performance index of between about 0.65 and 0.78 wherein the performance index is calculated using the formula:

Performance Index=$[X_{cont}/X_{int}+X_{int}/D]/2$ wherein:

Xcont (Watt-hrs) is determined by subjecting said cell to a constant power drain of 1 Watt to a cut off voltage of 0.9 volts;

Xint (Watt-hrs) is determined by subjecting said cell to a first power drain wherein the cell is subjected to a drain of 1 Watt for a period of 3 seconds, followed immediately by subjecting the same cell to a second power drain at 0.1 Watt for 7 seconds, said first drain followed by said second drain comprising a single cycle, said single cycle being repeated over and over continuously to a cutoff voltage of 0.9 volts; and D is the theoretical capacity of the cell (Watt-hrs)

3. The alkaline cell of claim 1 wherein said cell is an AA size cell having an actual energy output between about 1.31 and 1.78 Watt-hours when drained at a constant power drain of 1 Watt to a cut off voltage of 0.9 Volts, and said cell having a performance index of between about 0.65 and 0.78 wherein the performance index is calculated using the formula:

Performance Index=$[X_{cont}/X_{int}+X_{int}/D]/2$ wherein:

Xcont (Watt-hrs) is determined by subjecting said cell to a constant power drain of 1 Watt to a cut off voltage of 0.9 volts;

Xint (Watt-hrs) is determined by subjecting said cell to a first power drain wherein the cell is subjected to a drain of 1 Watt for a period of 3 seconds, followed immediately by subjecting the same cell to a second power drain at 0.1 Watt for 7 seconds, said first drain followed by said second drain comprising a single cycle, said single cycle being repeated over and over continuously to a cutoff voltage of 0.9 volts; and D is the theoretical capacity of the cell (Watt-hrs).

4. The alkaline cell of claim 1 wherein said nickel oxyhydroxide is in the form of a powder and at least a portion of the surface of said Nickel oxyhydroxide particles is coated with cobalt oxyhydroxide.

5. The alkaline cell of claim 1 wherein said said cathode further comprises conductive carbon particles, said carbon particles comprising between about 10 and 100% of an oxidation resistant graphite.

6. The alkaline cell of claim 1 wherein the inside surface of said outer housing faces said cathode and said inside surface has a coating thereon comprising an oxidation-resistant graphite.

7. A primary alkaline cell comprising a negative and a positive terminal, and an outer housing having a closed end and opposing open end, said cell further comprising an anode comprising zinc particles and a cathode comprising nickel oxyhydroxide within said housing, a separator between said anode and cathode, an alkaline electrolyte solution contacting said anode and cathode, and an end cap assembly sealing the open end of said housing thereby forming a boundary surface around the cell interior; wherein at least 1 percent by weight of the total zinc in the anode comprises zinc fines of dimensions suitable to pass through a standard 325 mesh sieve having square openings of 0.045 mm; wherein said cathode further comprises conductive carbon particles comprising an oxidation-resistant graphite; wherein the cathode comprises at least one cathode pellet having an opening defined therethrough devoid of cathode material, with at least a portion of the outer surface of said cathode contacting the inside surface of said housing.

8. The alkaline cell of claim 7 wherein said cell has a performance index of between about 0.65 and 0.78 wherein the performance index is calculated using the formula:

Performance Index=$[X_{cont}/X_{int}+X_{int}/D]/2$ wherein:

Xcont (Watt-hrs) is determined by subjecting said cell to a constant power drain of 1 Watt to a cut off voltage of 0.9 volts;

Xint (Watt-hrs) is determined by subjecting said cell to a first power drain wherein the cell is subjected to a drain of 1 Watt for a period of 3 seconds, followed immediately by subjecting the same cell to a second power drain at 0.1 Watt for 7 seconds, said first drain followed by said second drain comprising a single cycle, said single cycle being repeated over and over continuously to a cutoff voltage of 0.9 volts; and D is the theoretical capacity of the cell (Watt-hrs).

9. The alkaline cell of claim 7 wherein said cell is an AA size cell having an actual energy output between about 1.31 and 1.78 Watt-hours when drained at a constant power drain of 1 Watt to a cut off voltage of 0.9 Volts, and said cell having a performance index of between about 0.65 and 0.78 wherein the performance index is calculated using the formula:

Performance Index=$[X_{cont}/X_{int}+X_{int}/D]/2$ wherein:

Xcont (Watt-hrs) is determined by subjecting said cell to a constant power drain of 1 Watt to a cut off voltage of 0.9 volts;

Xint (Watt-hrs) is determined by subjecting said cell to a first power drain wherein the cell is subjected to a drain of 1 Watt for a period of 3 seconds, followed immediately by subjecting the same cell to a second power drain at 0.1 Watt for 7 seconds, said first drain followed by said second drain comprising a single cycle, said single cycle being repeated over and over continuously to a cutoff voltage of 0.9 volts; and D is the theoretical capacity of the cell (Watt-hrs).

10. The alkaline cell of claim 7 wherein the cathode comprises a plurality of cathode pellets; wherein each of said pellets has a central opening devoid of cathode material; wherein said cathode pellets are stacked within the housing so that said openings devoid of cathode material form a core, with the outer surface of said cathode contacting the inside surface of said housing.

11. The alkaline cell of claim 7 wherein said outer housing is of cylindrical shape.

12. The alkaline cell of claim 7 wherein said nickel oxyhydroxide is in the form of a powder having a mean average particle size between about 2 and 50 microns.

13. The alkaline cell of claim 7 wherein said zinc is in the form of a powder having a mean average particle size between about 1 and 250 micron.

14. The alkaline cell of claim 7 wherein at least 5 percent by weight of the total zinc in the anode comprises zinc fines of dimensions suitable to pass through a standard 200 mesh screen having square openings of 0.075 mm.

15. The alkaline cell of claim 7 wherein at least 10 percent by weight of the total zinc in the anode comprises zinc fines of dimensions suitable to pass through a standard 200 mesh screen having square openings of 0.075 mm, and said total zinc in the anode further comprises zinc particles of larger size than said zinc fines so that the average particle size of said total zinc is between about 75 and 340 micron.

16. The alkaline cell of claim 7 wherein at least 10 percent by weight of the total zinc in the anode comprises zinc fines of dimensions suitable to pass through a standard 200 mesh screen having square openings of 0.075 mm, wherein the average particle size of said zinc fines is between about 1 and 75 micron; and said total zinc in the anode further comprises zinc particles of larger size than said zinc fines so that the average particle size of said total zinc is between about 75 and 340 micron.

17. The alkaline cell of claim 7 wherein at least 50 percent by weight of the total zinc in the anode comprises zinc fines of dimensions suitable to pass through a standard 200 mesh screen having square openings of 0.075 mm, and said total zinc in the anode further comprises zinc particles of larger size than said zinc fines so that the average particle size of said total zinc is between about 75 and 200 micron.

18. The alkaline cell of claim 7 wherein at least 50 percent by weight of the total zinc in the anode comprises zinc fines of dimensions suitable to pass through a standard 200 mesh screen having square openings of 0.075 mm, wherein said zinc fines have an average particle size of between about 1 and 75 micron, and said total zinc in the anode further comprises zinc particles of larger size than said zinc fines so that the average particle size of said total zinc is between about 75 and 200 micron.

19. The alkaline cell of claim 7 wherein at least 5 percent by weight of the total zinc in the anode comprises zinc fines of dimensions suitable to pass through a standard 325 mesh screen having square openings of 0.045 mm.

20. The alkaline cell of claim 7 wherein at least 10 percent by weight of the total zinc in the anode comprises zinc fines of dimensions suitable to pass through a standard 325 mesh screen having square openings of 0.045 mm, and said total zinc in the anode further comprises zinc particles of larger size than said zinc fines so that the average particle size of said total zinc is between about 35 and 314 micron.

21. The alkaline cell of claim 7 wherein at least 10 percent by weight of the total zinc in the anode comprises zinc fines of dimensions suitable to pass through a standard 325 mesh screen having square openings of 0.045 mm, wherein said zinc fines have a average particle size between about 1 and 35 micron, and said total zinc in the anode further comprises zinc particles of larger size than said zinc fines so that the mean average particle size of said total zinc is between about 35 and 314 micron.

22. The alkaline cell of claim 7 wherein at least 50 percent by weight of the total zinc in the anode comprises zinc fines of dimensions suitable to pass through a standard 325 mesh screen having square openings of 0.045 mm, and said total zinc in the anode further comprises zinc particles of larger size than said zinc fines so that the average particle size of said total zinc is between about 35 and 125 micron.

23. The alkaline cell of claim 7 wherein at least 50 percent by weight of the total zinc in the anode comprises zinc fines of dimensions suitable to pass through a standard 325 mesh screen having square openings of 0.045 mm, wherein said zinc fines has a mean average particle size between about 1 and 35 micron, and said total zinc in the anode further comprises zinc particles of larger size than said zinc fines so that the average particle size of said total zinc is between about 35 and 125 micron.

24. The alkaline cell of claim 7 wherein the total zinc in the anode comprises at least 10 percent by weight zinc fines of dimensions suitable to pass through a standard 325 mesh screen having square openings of 0.045 mm, and said total zinc in the anode further comprises zinc particles of larger size being unable to pass through a 325 mesh screen, said larger size zinc particles comprising at least about 10 percent by weight of the total zinc.

25. The alkaline cell of claim 7 wherein the total zinc in the anode comprises at least 10 percent by weight zinc fines of dimensions suitable to pass through a standard 325 mesh screen having square openings of 0.045 mm, wherein said zinc fines has an average particle size between about 1 and 35 micron, and said total zinc in the anode further comprises zinc particles of larger size being unable to pass through a 325 mesh screen, said larger size zinc particles comprising at least about 10 percent by weight of the total zinc.

26. The alkaline cell of claim 7 wherein the total zinc in the anode comprises between about 10 and 90 percent by weight zinc fines of dimensions suitable to pass through a standard 325 mesh screen having square openings of 0.045 mm, and the remainder of said total zinc in the anode comprises zinc particles of larger size being unable to pass through a 325 mesh screen.

27. The alkaline cell of claim 7 wherein the total zinc in the anode comprises between about 10 and 90 percent by weight zinc fines of dimensions suitable to pass through a standard 325 mesh screen having square openings of 0.045 mm, wherein said zinc fines has an average particle size between about 1 and 35 micron, and the remainder of said total zinc in the anode comprises zinc particles of larger size being unable to pass through a 325 mesh screen.

28. The alkaline cell of claim 7 wherein the total zinc in the anode comprises between about 35 and 70 percent by weight zinc fines of dimensions suitable to pass through a standard 325 mesh screen having square openings of 0.045 mm, and the remainder of said total zinc in the anode comprises zinc particles of larger size being unable to pass through a 325 mesh screen.

29. The alkaline cell of claim 7 wherein the total zinc in the anode comprises between about 35 and 70 percent by weight zinc fines of dimensions suitable to pass through a standard 325 mesh screen having square openings of 0.045 mm, wherein said zinc fines has an average particle size between about 1 and 35 micron, and the remainder of said total zinc in the anode comprises zinc particles of larger size being unable to pass through a 325 mesh screen.

30. The alkaline cell of claim 7 wherein said cathode further comprises conductive carbon particles comprising an oxidation-resistant graphite.

31. The alkaline cell of claim 7 wherein said inside surface of the outer housing has a coating thereon comprising an oxidation-resistant graphite.

32. The alkaline cell of claim 7 wherein said oxidation resistant graphite has a total ash content of less than 0.1 percent by weight.

33. The alkaline cell of claim 32 wherein said oxidation resistant graphite is in a particulate form having a B.E.T. specific surface area of less than 15 $m^2/g$.

34. The alkaline cell of claim 33 wherein said oxidation-resistant graphite has an average particle size ranging between about 3 and 30 microns.

35. The alkaline cell of claim 33 wherein said oxidation-resistant graphite has an average particle size ranging between about 5 and 20 microns.

36. The alkaline cell of claim 7 wherein said oxidation-resistant graphite has a total ash content of less than 0.1 percent by weight, a B.E.T. specific surface area of less than 10 $m^2/g$, and an average particle size ranging between about 5 and 20 microns.

37. The alkaline cell of claim 34, wherein the oxidation-resistant graphite has a high degree of crystallinity, characterized by having a value for crystallite size, in the "c" crystal axis direction, $L_c$, of greater than 1500 Angstroms and a $d_{002}$ lattice constant of less than 3.356 Angstroms.

38. The alkaline cell of claim 34 wherein the oxidation-resistant graphite has a value for the crystal lattice defect ratio of less than 0.15, wherein said lattice defect ratio is defined as the ratio of the intensity of the "D" absorption band centered between 1330 and 1360 $cm^{-1}$ to the intensity of the "G" absorption band centered between 1570 and 1580 $cm^{-1}$ in the first order laser Raman absorption spectrum.

39. The alkaline cell of claim 7 wherein said nickel oxyhydroxide further comprises a bulk dopant selected from the group consisting of aluminum, manganese, cobalt, zinc, gallium, indium, and any mixture thereof.

40. The alkaline cell of claim 7 wherein said nickel oxyhydroxide is selected from the group consisting of beta-nickel oxyhydroxide, gamma-nickel oxyhydroxide, and mixtures thereof.

41. The alkaline cell of claim 7 wherein said nickel oxyhydroxide is in the form of a powder comprising particles wherein at least a portion of the surfaces of said particles is coated with cobalt oxyhydroxide.

42. The alkaline cell of claim 7 wherein said cathode comprises between about 80 and 95 percent by weight nickel oxyhydroxide.

43. The alkaline cell of claim 7 wherein said electrolyte solution comprises an aqueous solution of an alkali metal hydroxide salt selected from the group consisting of potassium hydroxide, sodium hydroxide, lithium hydroxide, and mixtures thereof.

* * * * *